United States Patent
Glover et al.

(10) Patent No.: US 8,850,026 B2
(45) Date of Patent: *Sep. 30, 2014

(54) METHODS AND APPARATUS TO ALLOCATE RESOURCES ASSOCIATED WITH A DISTRIBUTIVE COMPUTING NETWORK

(71) Applicant: AT&T Intellectual Property I, L.P., Atlanta, GA (US)

(72) Inventors: Rene Glover, Pelham, AL (US); Wiley C. Wilkins, McKinney, TX (US); Robert W. Gulledge, St. Charles, MO (US); James Paul Fox, Homewood, AL (US); Sapna Jain, Murphy, TX (US); Ramasubramanian Raghavan, Frisco, TX (US); Jonathan Chester Gathman, Arnold, MO (US); Mark A. Horstman, Maryland Heights, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,865

(22) Filed: May 6, 2013

(65) Prior Publication Data

US 2013/0246626 A1 Sep. 19, 2013

Related U.S. Application Data

(63) Continuation of application No. 13/567,405, filed on Aug. 6, 2012, now Pat. No. 8,438,286, which is a continuation of application No. 12/619,301, filed on Nov. 16, 2009, now Pat. No. 8,250,213.

(51) Int. Cl.
*G06F 15/16* (2006.01)
*H04L 12/911* (2013.01)
*G06F 9/50* (2006.01)

(52) U.S. Cl.
CPC ............ *H04L 47/781* (2013.01); *G06F 9/5072* (2013.01)
USPC ............................ 709/226; 709/222; 709/225

(58) Field of Classification Search
USPC ......... 709/226, 223–225, 203–205, 217, 218; 718/100, 102–104, 107
See application file for complete search history.

(56) References Cited

U.S. PATENT DOCUMENTS

| 5,475,819 A | 12/1995 | Miller et al. |
| 6,058,426 A | 5/2000 | Godwin et al. |

(Continued)

FOREIGN PATENT DOCUMENTS

| CN | 102655532 A | 9/2012 |
| JP | 2012208747 A | 10/2012 |

(Continued)

OTHER PUBLICATIONS

U.S. Office Action dated Nov. 17, 2011 in U.S. Appl. No. 12/619,301.

(Continued)

*Primary Examiner* — Ruolei Zong
(74) *Attorney, Agent, or Firm* — Hartman & Citrin LLC

(57) ABSTRACT

Methods and apparatus to allocate resources associated with a distributive computing network are disclosed. A disclosed example method includes receiving resource allocation information associated with a service that is to be hosted by a distributive computing network, determining a first configuration type and a second configuration type specified within the received resource allocation information, determining at least one configuration group associated with the first configuration type and at least one configuration group associated with the second configuration type, determining physical resources included within the distributive computing network to host the service, electronically allocating the physical resources for the at least one configuration group associated with the first configuration type, electronically allocating the physical resources for the at least one configuration group associated with the second configuration type, and hosting the service within the physical resources in accordance with the allocations.

20 Claims, 11 Drawing Sheets

(56) References Cited

U.S. PATENT DOCUMENTS

| | | | |
|---|---|---|---|
| 6,880,002 | B2 | 4/2005 | Hirschfeld et al. |
| 6,990,666 | B2 | 1/2006 | Hirschfeld et al. |
| 7,437,706 | B2 | 10/2008 | Woodgeard |
| 7,802,238 | B2 | 9/2010 | Clinton |
| 8,014,308 | B2 | 9/2011 | Gates et al. |
| 8,015,547 | B2 | 9/2011 | Harvey et al. |
| 8,131,844 | B2 | 3/2012 | Moore et al. |
| 8,495,611 | B2 | 7/2013 | Mccarthy et al. |
| 2003/0051021 | A1 | 3/2003 | Hirschfeld et al. |
| 2005/0138204 | A1 | 6/2005 | Iyer et al. |
| 2005/0138625 | A1 | 6/2005 | Carroll et al. |
| 2006/0085785 | A1 | 4/2006 | Garrett |
| 2008/0034365 | A1 | 2/2008 | Dahlstedt |
| 2008/0080396 | A1 | 4/2008 | Meijer et al. |
| 2008/0080552 | A1 | 4/2008 | Gates et al. |
| 2008/0082546 | A1 | 4/2008 | Meijer |
| 2008/0209451 | A1 | 8/2008 | Michels et al. |
| 2009/0183168 | A1 | 7/2009 | Uchida |
| 2010/0058328 | A1 | 3/2010 | DeHaan |
| 2011/0047540 | A1 | 2/2011 | Williams et al. |
| 2011/0087783 | A1 | 4/2011 | Annapureddy et al. |
| 2011/0126168 | A1 | 5/2011 | Ilyayev |
| 2011/0126197 | A1 | 5/2011 | Larsen et al. |
| 2011/0161912 | A1 | 6/2011 | Eteminan et al. |
| 2012/0180029 | A1 | 7/2012 | Hill et al. |
| 2012/0185913 | A1 | 7/2012 | Martinez et al. |
| 2012/0278454 | A1 | 11/2012 | Stewart et al. |
| 2012/0331441 | A1 | 12/2012 | Adamson |
| 2013/0073614 | A1 | 3/2013 | Shine et al. |
| 2013/0159892 | A1 | 6/2013 | Suraj et al. |
| 2013/0185699 | A1 | 7/2013 | Oguma et al. |
| 2013/0191823 | A1 | 7/2013 | Davidson et al. |
| 2013/0234853 | A1 | 9/2013 | Kazerouni |
| 2013/0239089 | A1 | 9/2013 | Eksten et al. |
| 2013/0254755 | A1 | 9/2013 | Yousouf et al. |

FOREIGN PATENT DOCUMENTS

| | | |
|---|---|---|
| WO | WO 2013072925 A2 | 5/2013 |
| WO | WO 2013133922 A1 | 9/2013 |

OTHER PUBLICATIONS

U.S. Notice of Allowance dated Apr. 26, 2012 in U.S. Appl. No. 12/619,301.

Brady, Kevin F., "Cloud Computing—Is It Safe for IP?" Portfolio Media, Inc., [http://www.law360.com/print_article/113709 on Aug. 27, 2009. Retrieved from Internet on Sep. 3, 2009, 8 pages.

"Amazon Elastic Computing Cloud," http://aws.amazon.com/ec2. Retrieved from Internet on Dec. 23, 2009, 8 pages.

Armbrust et al., "Above the Clouds: A Berkeley View of Cloud Computing," Technical Report UCB/EECS-2009-28, EECS Department, University of California, Berkeley, February Technical Report No. UCB/EECS-2009-28, http://www.eecs.berkeley.edu/Pubs/TechRpts/2009/EECS-2009-28.html, Feb. 10, 2009, 25 pages.

Clark et al., "Live Migration of Virtual Machines," in Proceedings of NSDA, http://www.cl.carn.ac.uk/research/srg/netos/papers/2005-migration-nsdi-pre.pdf, May 2005, 14 pages.

Duffield et al., "Resource Management with Hoses: Point-to-Cloud Services for Virtual Private Networks," IEEE ACM Transactions on Networks, Dec. 2002, 16 pages.

Cohen, Reuven, "Elasticvapor Blog: Virtual Private Cloud," www.elasticvapor.com/2008/05/virtual-private-cloud-vpc.htm, May 8, 2008, 2 pages.

Google, "Google App Engine," http://code.google.com/appengine. Apr. 7, 2008, 4 pages.

Nelson, et al., "Fast Transparent Migration for Virtual Machines," in ATEC '05 Proceedings of the Annual Conference on USENIX Annual Technical Conference, 2005, 4 pages.

Ramakrishnan et al., "Live Data Center Migration Across WANs: A Robust Cooperative Context Aware Approach," in INM '07: Proceedings of the SIGCMM Workshop on Internet Network Management, Aug. 27-31, 2007, 6 pages.

Ruth et al., "Autonomic Live Adaptation of Virtual Computational Environments in a Multi-Domain Infrastructure," in ICAC '06: Proceedings of the 2006 IEEE International Conference on Autonomic Computing, 2006, 10 pages.

Sundararaj et al., "Towards Virtual Networks for Virtual Machine Grid Computing," in VM '04: Proceedings of the 3rd Conference on Virtual Machine Research and Technology Symposium, 2004, 14 pages.

U.S. Notice of Allowance dated Oct. 15, 2012 in U.S. Appl. No. 13/567,405.

Christina Vecchiola et al., "High-Performance Cloud Computing: A View of Scientific Applications," IEEE 2009, 13 Pages (4-16).

Liang Zhao et al., "Evaluating Cloud Platform Architecture with the CARE framework," Asia Pacific Software Engineering Conference, 2010 IEEE, 10 Pages (60-69).

Fan et al, "Scientific application deployment on Cloud: A Topology-Aware Method," Concurrency and Computation: Practice and Experience 2012, Published online in Wiley InterScience (www.interscience.wiley.com).

Calheiros et al, "CloudSim: A Toolkit for the Modeling and Simulation of Cloud Resource Management and Application Provisioning Techniques," Software: Practice and Experience, 41(1): 23-50,Wiley, Jan. 2011.

Zeng et al, "A SaaS Development Platform Based on Cloud Computing," TELKOMNIKA, vol. 11, No. 3, Mar. 2013, pp. 1646-1651.

US 8,850,026 B2

METHODS AND APPARATUS TO ALLOCATE RESOURCES ASSOCIATED WITH A DISTRIBUTIVE COMPUTING NETWORK

CROSS-REFERENCE TO RELATED APPLICATIONS

This patent application is a continuation of and claims priority to U.S. patent application Ser. No. 13/567,405, now U.S. Pat. No. 8,438,286, entitled "Methods And Apparatus To Allocate Resources Associated With A Distributive Computing Network," filed Aug. 6, 2012, which is a continuation of U.S. patent application Ser. No. 12/619,301, now U.S. Pat. No. 8,250,213, entitled "Methods And Apparatus To Allocate Resources Associated With A Distributive Computing Network," filed Nov. 16, 2009, each of which is herein incorporated by reference in its entirety.

FIELD OF THE DISCLOSURE

This disclosure relates generally to cloud computing and, more particularly, to methods and apparatus to allocate resources associated with a distributive computing network.

BACKGROUND

Cloud computing platforms are becoming popular with customers by providing flexible, on demand resources at a relatively low cost. A cloud computing network, also known as a distributive computing network, enables clients to manage web-based applications (e.g., services) and/or data resources by dynamically leasing resources from service providers. This dynamic leasing of resources creates the appearance and function of a distributive computing network and, thus, can be referred to as virtualization of a computer network. Since cloud platforms utilize virtualization of network and/or computing resources, new resources for a client may be quickly allocated to the client as needed within short periods of time by a service provider. Additionally, cloud computing virtualization enables service providers to dynamically multiplex resources among multiple clients without dedicating individual physical resources to each client.

DETAILED DESCRIPTION

Figure 1:
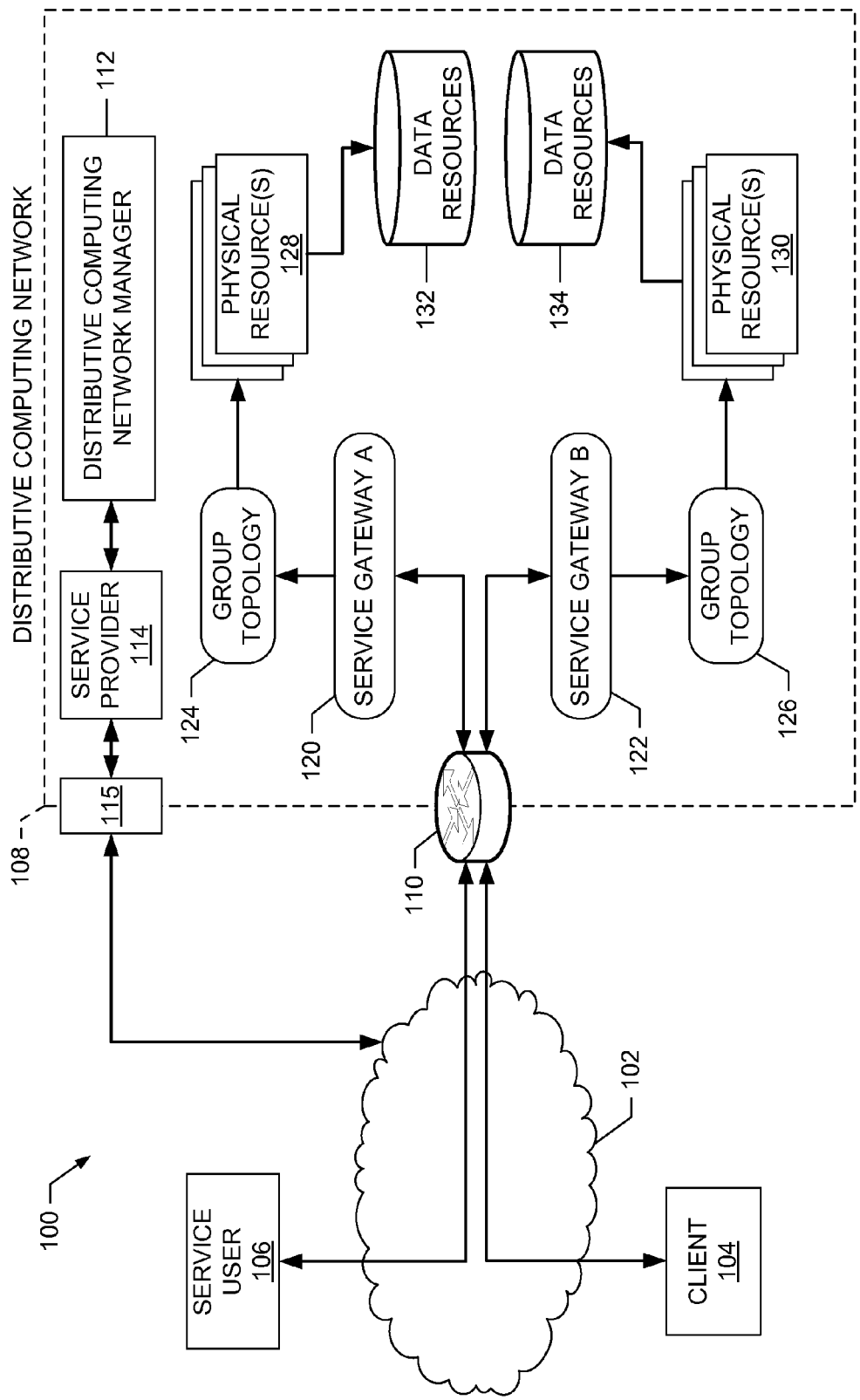
FIG. 1 is a schematic illustration of an example communication system including a distributive computing network managed by a distributive computing network manager.

Example methods, articles of manufacture, and apparatus to allocate resources associated with a distributive computing network are disclosed. A disclosed example method includes receiving resource allocation information associated with a service that is to be hosted by a distributive computing network, determining a first configuration type and a second configuration type specified within the received resource allocation information, determining at least one configuration group associated with the first configuration type and at least one configuration group associated with the second configuration type, and determining physical resources included within the distributive computing network to host the service. The example disclosed method further includes electronically allocating the physical resources for the at least one configuration group associated with the first configuration type, electronically allocating the physical resources for the at least one configuration group associated with the second configuration type, and hosting the service within the physical resources in accordance with the allocations.

A disclosed example apparatus includes a resource processor to determine a first configuration type and a second configuration type specified within received resource allocation information associated with a service that is to be hosted by a distributive computing network and a configuration processor to determine at least one configuration group associated with the first configuration type and at least one configuration group associated with the second configuration type. The example apparatus also includes a resource identifier to determine physical resources included within the distributive computing network to host the service and a group generator to allocate a portion of the physical resources for at least one configuration group associated with the first configuration type and to allocate a portion of the physical resources for at least one configuration group associated with the second configuration type.

Distributive computing networks (e.g., cloud computing networks) enable subscribing clients (e.g., customers and/or service deployers) to flexibly lease servers and/or other computing resources based on actual usage. Distributive computing networks are typically used by clients to host services that may be implemented as software-as-a-service (SaaS). SaaS systems may include web-based front-end applications (e.g., online retail businesses) and/or data processing applications (e.g., online document processing applications). Further, distributive computing networks may be implemented as infrastructure-as-a-service (IaaS) data storage applications and/or platform-as-a-service (PaaS) customized applications. For example, web-based applications may be designed for customers to purchase goods or services (e.g., an online retail site), enroll in a service (e.g., an online news reporting site), etc. The clients that may deploy web-based services, data processing services, and/or customized services may range from enterprise level businesses to entrepreneurial individuals. A client may subscribe to a distributive computing network that is operated by a service provider. The service provider manages the allocation of resources within the distributive computing network for each hosted service.

The cloud service providers (e.g., cloud computing managers) may allocate resources based on consumer, customer, and/or client usage to maximize an operating efficiency (e.g., scalability) of multiple services hosted by resources. These resources may be allocated together or grouped as virtual machines that utilize the computing resources of one or more servers (e.g., processors, data storage databases, etc.) to host a service. The service providers may assign Internet Protocol (IP) addresses to each virtual machine and/or to each distributive computing network resource. The IP address may then be used by the service provider to route network traffic to the virtual machines hosting the requested service.

Prior distributive computing networks and/or computing clouds have been configured to provide relatively basic allocations of virtualized representations of virtual machines. For example, a client may deploy an online business application through a distributive computing network managed by a service provider. The service provider may select a plurality of servers located in different physical locations but logically grouped together as a virtual machine to host the online business. However, the service provider may only be capable of providing the client with the locations of the servers hosting the online business. Any changes to the online business initiated by the client are forwarded to the service provider. The service provider then determines the locations of the servers hosting the online business and applies the change to those servers. In this example, the client does not have the direct access to the network resources needed to perform modifications to the online business.

In other prior examples, a service provider may provide a client direct access to the computing resources within the distributive computing network. In such examples, the client may only be able to make a change to the online business by modifying all of the servers hosting the online business. The resources within a virtual machine may be grouped by physical location, resource identification value, and/or any other grouping criterion used by a service provider to identify resources. Further, because a service is hosted equally by servers associated with a virtual machine, a client is not able to configure the service so that some servers host a first revision of the service while other servers host a second revision of the service. These configuration and/or virtualized grouping limitations may be acceptable to some clients. However, some clients may require specialized configuration groupings to better provide the hosted service.

The example methods and apparatus described herein enable clients to create specialized virtualized groupings (e.g., configuration types and/or groups) for a virtual machine hosting a service. The virtualized groups may be organized by configuration types, with each configuration type including one or more configuration groups. A configuration type is a characterization or classification of an underlying resource used to host a service. A configuration type may characterize or classify resources by, for example, physical location, routing paths, service types, service lifecycles, scalability of resources, authorization level of access to the service, and/or operating environments. A configuration group is a subset or partition of a configuration type. A configuration type may be partitioned into one or more configuration groups based on the configuration type.

For example, a client may desire to have a configuration type of a virtual machine hosting a service based on specified development levels. The development configuration type may be partitioned into a test development level configuration group and a production development level configuration group. Additionally, the client may desire to have a second configuration type based on server locations. The server location configuration group may be partitioned into a Dallas, Tex. configuration group and a Singapore configuration group. With these two configuration types, the client can relatively quickly identify servers hosting the service that are associated with, for instance, the test development level configuration group or the production development level configuration group or, alternatively, the client can determine which servers are located in, for example, Dallas, Tex. and which servers are located in Singapore. The client may use each configuration type for different reasons. For example, the development configuration type may be used by the client to push an update to the service on servers associated with the test development configuration group. In another example, the Dallas, Tex. group may be used to update service usage agreements for customers within the United States.

The example methods, articles of manufacture, and apparatus described herein manage distributive computing networks so that servers or other computing resources within virtual machines may be accessed by clients and/or customers based on specified virtual (e.g., configuration) grouping criteria. Upon receiving a request from a client to create configuration group(s), the example methods, articles of manufacture, and apparatus allocate a portion of resources (e.g., servers, processors, data storage databases, physical resources, etc.) to each of the specified configuration groups. The example methods, articles of manufacture, and apparatus may then store and/or manage which resources are assigned to each group. Further, the example methods, articles of manufacture, and/or apparatus may route requests and/or traffic originating from clients and/or customers to the appropriate servers within a configuration group based on the type of request and/or traffic.

By enabling clients to specify configuration (e.g., virtualized) groups, clients can more effectively manage their services, applications or data that is hosted within a distributive computing network. Further, the clients have the flexibility to partition resources hosting their applications into configuration groups and/or subgroups to restrict access to each of the groups based on the individual(s) accessing the services, applications and/or data. Additionally, the example methods, articles of manufacture, and/or apparatus store client configurations and manage the allocation of resources for each client based on these configurations. The methods, articles of manufacture, and apparatus may dynamically change the allocation of resources assigned to each configuration group when resources are adjusted based on demand. Then, when a client and/or a customer accesses a particular group, the methods, articles of manufacture, and apparatus direct the access to the appropriate resources.

Additionally, the example methods, articles of manufacture, and apparatus described herein decipher the requirements of hosting each configuration group and provide the appropriate implementations for each service without having to access external management sources. Further, the methods, articles of manufacture, and apparatus provide a framework for hosting client services regardless of the runtime environment of the service.

In the interest of brevity and clarity, throughout the following disclosure, reference will be made to an example communication system 100 of FIG. 1. However, the methods, articles of manufacture, and apparatus described herein to allocate resources associated with distributive computing networks are applicable to other types of networks constructed using other network technologies, topologies and/or protocols.

FIG. 1 illustrates the example communication system 100 that is implemented in connection with a switching network 102 (e.g., the Internet). The example switching network 102 may include any type of network for routing packet-based communications (e.g., data). The switching network 102 may be implemented by any type of public switched telephone network (PSTN) system(s), public land-mobile network (PLMN) system(s), wireless distribution system(s), wired or cable distribution system(s), coaxial cable distribution system(s), fiber-to-the-home network(s), fiber-to-the-curb network(s), fiber-to-the-pedestal network(s), fiber-to-the-vault network(s), fiber-to-the-neighborhood network(s), Ultra High Frequency (UHF)/Very High Frequency (VHF) radio frequency system(s), satellite or other extra-terrestrial system(s), cellular distribution system(s), power-line broadcast system(s), and/or combinations and/or hybrids of these devices, systems and/or networks.

In the example of FIG. 1, the communication system 100 includes a client 104 and a service user 106 that are communicatively coupled to a distributive computing network 108 via the switching network 102. The example communication system 100 may include additional clients, service users, and/or distributive computing networks (not shown). The example client 104 functions as a service deployer to create and provide a service to be hosted by the distributive computing network 108. The client 104 may include any enterprise and/or individual that requests a service to be hosted within the distributive computing network 108. Additionally, the client 104 may access the distributive computing network 108 via the switching network 102 to manage, modify, and/or access the hosted service. Further, the client 104 may use the service hosted within the distributive computing network 108.

The example service user 106 may include a customer and/or a user of a service hosted by the distributive computing network 108. The service user 106 may access the service from any location via the switching network 102. Further, the service user 106 may include any individual, organization, and/or enterprise that may access the switching network 102 via any type of network and/or gateway including a Virtual Private Network (VPN), a Local Area Network (LAN), a Virtual LAN (VLAN), a Multiprotocol Label Switching (MPLS) VPN, etc.

The client 104 and/or the service user 106 are communicatively coupled to the distributive computing network 108 via a router 110. The router 110 may include a gateway router that routes traffic received from the switching network 102 to servers and/or computing resources within the distributive computing network 108. Additionally, the distributive computing network 108 may include other gateway routers (not shown). Further, the distributive computing network 108 may include internal routers (not shown) to route traffic within the distributive computing network 108 to appropriate physical and/or data resources. The distributive computing network 108 may include any type of virtualized network (e.g., a computing cloud network) that hosts one or more services for clients and/or service users based on, for example, usage requirements, bandwidth requirements, processor efficiency, etc.

The example distributive computing network 108 of FIG. 1 is managed by a distributive computing network manager 112 to control the creation, allocation, and/or distribution of services partitioned into virtualized groups specified by clients (e.g., the client 104). The distributive computing network manager 112 may also configure the routing of traffic within the distributive computing network 108 from gateway routers (e.g., the router 110) to an appropriate computing resource hosting a service. The routing configuration may be specified by routing tables. These routing tables may be distributed to each router within the distributive computing network 108 and may be updated as resource allocations are modified based on customer usage. Further, the distributive computing network manager 112 may be communicatively coupled to a service provider 114. The example communication system 100 shows the service provider 114 within the distributive computing network 108. However, in other examples the service provider 114 may be outside of the distributive computing network 108.

The example service provider 114 manages the configuration of the distributive computing network manager 112 and functions as an interface with clients. The example service provider 114 of FIG. 1 includes and/or is communicatively coupled to an interface 115 that the client 104 may utilize to create requests by providing resource allocation information. The resource allocation information may include information for creating a virtual machine to host a service, information for partitioning the virtual machine into one or more virtualized groups, and/or information defining a framework, environment, and/or runtime technology for hosting a service. Specifically, the resource allocation information may include a configuration type (e.g., a virtualized group type), one or more configuration groups within a configuration type, a location for one or more portions of the physical resources grouped together by a virtual machine, a data storage requirement, a bandwidth requirement, a runtime engine requirement, an operating system requirement, an application type, a service type, a hosting environment requirement, a lifecycle environment, or a size requirement for the portion of the distributive computing network.

The example distributive computing network manager 112 manages the allocation and assignment of services hosted by the resources of the distributive computing network 108. In the illustrated example, the resources are organized into virtual machines. A virtual machine may be created for each hosted service or a single virtual machine may host multiple servers. A virtual machine may include any number of servers, computing resources, processors, etc. The example distributive computing network 108 includes service gateways 120 and 122 that provide a service implementation and/or a routing interface for hosted service(s). Each service hosted by the distributive computing network 108 may include a service gateway or, alternatively, a service gateway may be shared by two or more services. In some examples, a service gateway may be created for each virtual machine and include a routing table of IP addresses assigned to each physical resource within the virtual machine. In other examples, a service gateway may be created for each virtualized group associated with a service hosted by a virtual machine.

In the example of FIG. 1, the service gateway A 120 is associated with a first service (e.g., service A) that is partitioned into configuration types and/or groups specified by a group topology 124. Each configuration group specified by the group topology 124 communicatively couples the service gateway A 120 to physical resources 128 (e.g., servers, computing resources, processors, hardware resources, etc.) and/or data resources 132 (e.g., servers, memory, databases, caches, etc.) based on criteria associated with each configuration group. For example, the group topology 124 may be implemented as a routing table that cross-references the resources 128 and 132 to a specified configuration group. Thus, when the service gateway A 120 receives a request for the service A, the service gateway A 120 of the illustrated example utilizes the group topology 124 routing table to identify the physical resources 128 that are to receive the request. In the example of FIG. 1, each of the physical resources 128 are communicatively coupled to the data resources 132. In other examples, a group of physical resources associated with a particular virtualized group may be communicatively coupled to two or more data resources. In yet other examples, configuration groups specified within a group topology may be communicatively coupled only to physical resources or to data resources.

Some or all of the physical resources 128 may be grouped together as a virtual group that includes servers and/or computing resources located in one or more locations. The grouped physical resources 128 may be part of a collection of resources within the control of the distributive computing network 108. The physical resources 128 are partitioned by the distributive computing network manager 112 to host the first service A. In some examples, servers that host the first service A may also host a second service (e.g., service B). However, these servers may be partitioned so that only a first portion of the server hosts the first service A and a second portion of the server hosts the second service B.

The service gateway B 122 of the illustrated example is associated with the service B. In the example of FIG. 1, service B is partitioned into virtualized (e.g., configuration) groups specified within a group topology 126. The group topology 126 may include different virtualized group types (e.g., configuration types). Additionally or alternatively, the group topology 126 may include different configuration groups within each configuration type as compared to the group topology 124 associated with the service A. Each configuration group specified within the group topology 126 is associated with physical resources 130 and data resources 134.

The physical resources 128 may be grouped together as a virtual machine that is assigned a first set of IP addresses. The physical resources 130 may be grouped together as a second virtual machine that is assigned a second set of IP addresses. Each virtual machine may route traffic among the servers and/or computing resources 128 and 130 with which it is associated based on routing requirements and/or the availability of processing power. The virtual machines may route traffic among its respective resources 128-134, the router 110, the group topologies 124 and 126, and/or the service gateways 120 and 122 using any type of LAN, VLAN, private LAN, and/or any other type of routing network included within the distributive computing network 108. The distributive computing network manager 112 may divide each of the physical resources 128 and 130 into virtualized groups (e.g., configuration groups) for a configuration type specified by the client 104. Further, the distributive computing network manager 112 may divide each of the physical resources 128 and 130 into configuration groups for multiple configuration types. In other words, the same physical resources 128 and 130 may be organized and/or partitioned into configuration groups for each configuration type.

For example, the physical resources 128 may be divided into configuration groups based on a location of the individual servers within the physical resources 128 (e.g., a first configuration type based on location). The same physical resources 128 may also be divided into configuration groups based on a development phase of the hosted service A (e.g., a second configuration type based on development phase). In this manner, the client 104 can manage the service A based on each configuration type without having to determine which servers within the physical resources 128 are associated with each configuration type and/or which configuration group. Because the distributive computing network 108 may change the allocation of resources to each configuration group based on usage, the distributive computing network manager 112 maintains service records identifying which of the physical resources 128 correspond to which configuration group.

Thus, when the client 104 desires to access the physical resources 128 associated with a specific geographic location, the distributive computing network manager 112 may provide the client 104 with an up-to-date list of the servers and/or computing resources associated with the selected configuration group. Additionally, in examples where the client 104 may request to view the physical resources 128 associated with multiple configuration groups, the distributive computing network manager 112 filters the resources based on the requested configuration groups and provides the filtered list to the client 104.

A configuration type may include a classification or characterization of a hosted service. Example classifications or characterizations may include a location, a routing path, a service type, a service lifecycle, a scalability of the physical resources, an authorization level of access to the service, or an operating environment. The service provider 114 enables the client to request one or more configuration types for the same physical resources 128 allocated to host a service. Upon receiving a service from the client 104 (e.g., the software to provide a service), the service provider 114 publishes the service (e.g., distributes the software) to the physical resources 128 allocated to host the service. In some examples, the service provider 114 may modify the allocations of physical resources 128 hosting the service based on demand for the service. In these examples, the distributive computing network manager 112 adjusts the configuration groups to match the adjusted allocation of the physical resources 128.

The distributive computing network manager 112 creates the configuration groups within the group topologies 124 and 126 based on resource allocation information from the client 104. The distributive computing network manager 112 also assigns, allocates, and/or partitions the physical resources 128 and 130 and/or the data resources 132 and 134 among the configuration group(s). Further, the distributive computing network manager 112 may install the service to be hosted into the respective physical resources 128 and 130. Installing the service may include configuring the physical resources 128 and 130 to implement a runtime technology that corresponds to the hosted service. Installing the service may also include configuring the physical resources 128 and 130 so that the service is hosted according to the requirements specified by a client 104 within the resource allocation information. For example, if a client 104 specifies that a service is to be partitioned within physical resources by a development configuration type that includes a testing development configuration group and a production development configuration group, the service may be implemented on a smaller portion of the physical resources for the testing development configuration group and implemented on a larger portion of the physical resources for the production development configuration group.

In some examples, each configuration group and/or configuration type associated with a service may include a service gateway. For example, each virtualized group within the group topology 124 may be communicatively coupled to a corresponding service gateway. The service gateways 120 and 122 may be implemented by respective services that are hosted by the corresponding physical resources 128 and 130. A service implementation may include a service image, a service instance, an environment, and/or a service application that is based on the service but may be modified based on the configuration group associated with the service implementation. For example, a service implementation for a production version of a service may have different features, functionality, data resources, and/or display characteristics than a service implementation for a testing or beta version of the service.

However, the service implementations are based on the same service.

Alternatively, the service gateways 120 and 122 may be implemented as routing interfaces that direct network traffic, client requests, and/or customer requests to the appropriate configuration groups associated with the respective group topologies 124 and 126. The distributive computing network manager 112 and/or the service provider 114 may assign an IP address space to each service gateway 120 and 122. The distributive computing network manager 112 and/or the service provider 114 may also assign subsets of the IP address space to each respective physical resource 128 and 130 that is hosting a service. For example, the service user 106 may transmit a request with a destination specified as a web address or a Uniform Resource Locator (URL) corresponding to the service A. The request from the service user 106 to access the service A is received by the router 110. The request may include a destination IP address (provided by domain name servers within the switching network 102) that is associated with the web address transmitted by the service user 106. The router 110 determines that the destination IP address corresponds to the service A and forwards the request to the service gateway A 120. Upon receiving the request, the service gateway A 120 determines local IP addresses that are associated with a configuration group specified within the group topology 124. The determination may be based on which configuration group is authorized and/or available to receive the request. The local IP addresses may be assigned to each of the physical resources 128 associated with the respective configuration groups. The service gateway A 120 forwards the request to the physical resources 128 using the local IP addresses.

While the distributive computing network 108 is shown with resources 128-134 allocated to respective services A and B, the distributive computing network 108 may include additional physical resource, data resources, services, service gateways, and/or group topologies (not shown) and/or may allocate the resources differently. The resources 128-134 may be located at a single physical location or, alternatively, the resources 128-134 may be located across different physical locations. Further, the physical resources 128 and 130 may be implemented on a single server and/or computing resource or, alternatively, on a plurality of servers and/or computing resources. Likewise, the data resources 132 and 134 may be implemented with a single database and/or memory or, alternatively, with a plurality of databases and/or memories.

Figure 2:
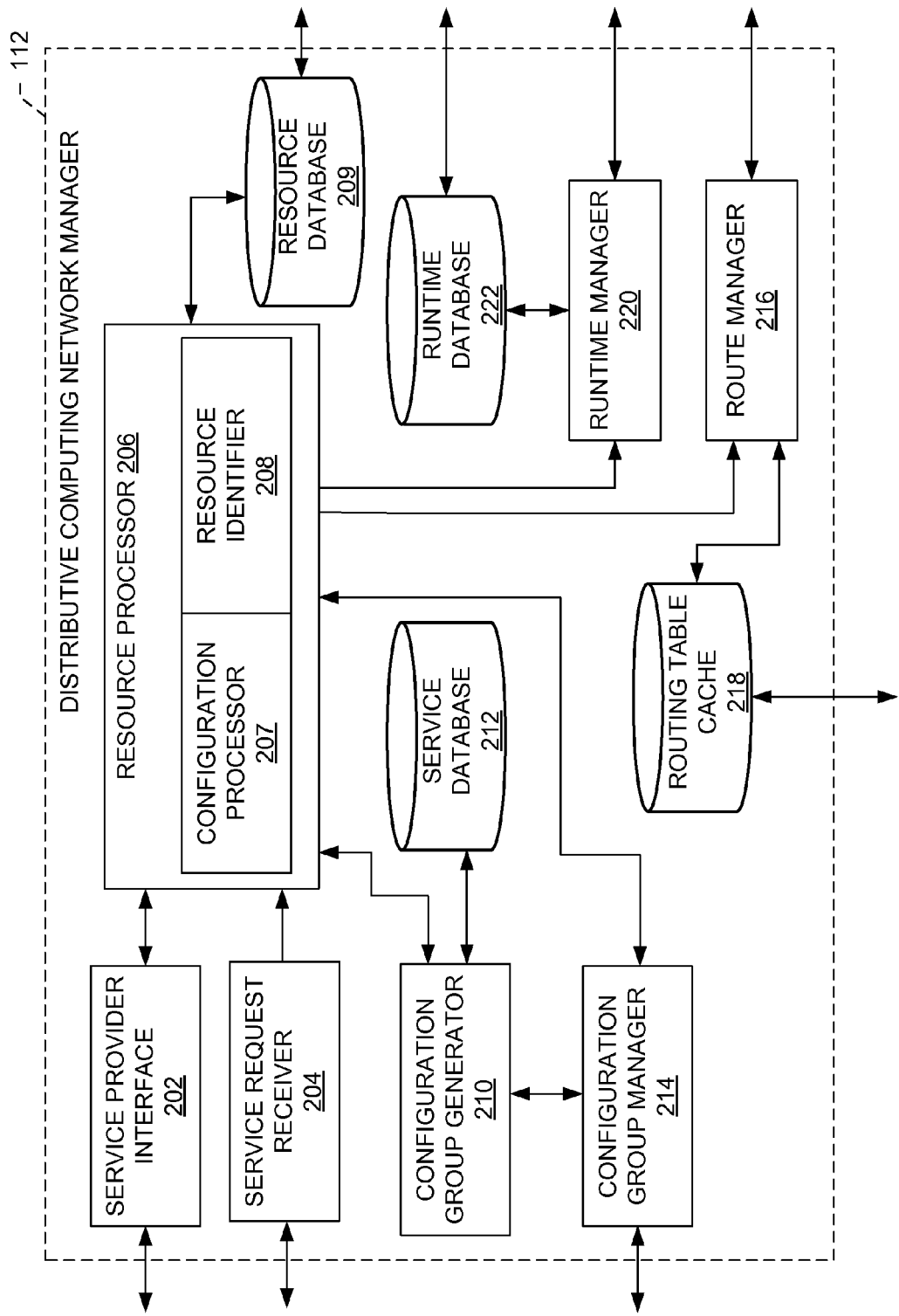
FIG. 2 illustrates an example manner of implementing the distributive computing network manager for the example communication system of FIG. 1.

FIG. 2 illustrates an example manner of implementing the distributive computing network manager 112 within the example communication system 100 of FIG. 1. The example distributive computing network manager 112 of FIG. 2 creates and manages configuration groups, manages runtime technologies based on a service type, and/or configures physical resources based on a service type and/or a configuration group associated with a service.

To enable the service provider 114 of FIG. 1 to manage the distributive computing network 108, the example distributive computing network manager 112 of FIG. 2 includes a service provider interface 202. The example service provider interface 202 may be communicatively coupled to the service provider 114 via any wired and/or wireless communication path. The service provider interface 202 provides a management interface that the service provider 114 may use to monitor the performance and/or modify functionality of the distributive computing network manager 112 and/or the distributive computing network 108. In some examples, the service provider 114 may directly control the distributive computing network manager 112 via the service provider interface 202 to troubleshoot detected issues. Further, the service provider 114 may use the service provider interface 202 to update the distributive computing network manager 112 to reflect additions, removals, and/or modifications of physical and/or data resources. An update may also include providing the distributive computing network manager 112 with any routing changes of physical and/or data resources through the update of routing tables.

The example service provider interface 202 may also be used by the service provider 114 to deploy services to the distributive computing network manager 112 that are to be hosted within the distributive computing network 108. For example, upon receiving a request for a new service, the service provider 114 may forward the new service to the distributive computing network manager 112 for deployment to resources within the distributive computing network 108. The deployment may include providing a runtime technology that is to operate the service. The deployment may also include parameters for hosting a service based on a service type. For example, a hosted service may include different hosting environments and/or implementations based on a location of a server hosting the service. The distributive computing network manager 112 may receive the different hosting information via the service provider interface 202 from the service provider 114 and configure the resources to host the service based on which resources are specified to host each implementation of the service.

To receive resource allocation information from one or more clients, the example distributive computing network manager 112 of FIG. 2 includes a service request receiver 204. The example service request receiver 204 receives requests from the service provider 114 that originated from clients (e.g., the client 104 of FIG. 1). The requests include resource allocation information that may specify a service to be hosted, configuration type(s), one or more configuration groups, a location for one or more portions of the physical resources grouped together by a virtual machine, a data storage requirement, a bandwidth requirement, a runtime engine requirement, an operating system requirement, an application type, a service type, a hosting environment requirement, a lifecycle environment, or a size requirement for the portion of the distributive computing network.

Example configuration types include a physical location, a routing path, an application type, an application lifecycle, a scalability of the physical resources, an authorization level of access to the service, and/or an operating environment. The authorization level may identify which requests from individuals may access non-production configuration groups and which requests and/or traffic from individuals should be routed to groups associated with a production version of the service. In another example, the authorization level may specify that requests and/or traffic originating from individuals from a first location are to be routed to a first configuration group, requests and/or traffic originating from individuals from a second location are to be routed to a second configuration group, and/or requests and/or traffic originating from individuals from a third location are to be routed to a third configuration group.

Upon receiving resource allocation information, the service request receiver 204 may format the information based on information type and forward the information for processing and implementation within the distributive computing network 108. For example, a client may specify that a service is to be grouped by two different configuration types, with each configuration type having three different configuration groups. The service request receiver 204 may identify this information within the resource allocation information and forward an instruction to a resource processor 206 to create the configuration groups based on the criteria specified by the client.

To process resource allocation information from the service request receiver 204 and/or to process service provider instructions from the service provider interface 202, the example distributive computing network manager 112 of FIG. 2 includes the resource processor 206. The example resource processor 206 receives resource allocation instructions from the service request receiver 204 and processes those instructions into an appropriate action. For example, the resource processor 206 may determine a first configuration type and a second configuration type specified within received resource allocation information associated with a service that is to be hosted by the distributive computing network 108. The resource processor 206 includes a configuration processor 207 that determines at least one configuration group associated with the first configuration type and at least one configuration group associated with the second configuration type. The resource processor 206 also includes a resource identifier 208 that determines physical resources included within the distributive computing network 108 to host the service.

The resource identifier 208 of the illustrated example identifies physical and/or data resources to host a service by accessing a resource database 209 that includes a list of which resources are allocated to which services. The example resource database 209 also includes a list of which configuration groups are associated with which physical and/or data resources. Additionally, the resource database 209 may be updated upon each new allocation of resources within the distributive computing network 108 by the distributive computing network manager 112 and/or the service provider 114 via a communication path. The resource database 209 may be implemented by Electronically Erasable Programmable Read-Only Memory (EEPROM), Random Access Memory (RAM), Read-Only Memory (ROM), and/or any other type of memory.

Based upon data returned from the resource database 209, the example resource identifier 208 determines which resources are available to host a requested service. The resource identifier 208 then selects the resources to create a virtual machine to host the service and instruct a configuration group generator 210 to partition the resources within the virtual machine based on the specified configuration groups. The example configuration group generator 210 allocates the physical resources for the configuration group(s) associated with the configuration type(s) implemented by the service in question. The configuration group generator 210 allocates the physical resources by storing the configuration group(s) associated with the configuration type(s) implemented by the service in question to the resource database 209 (e.g., defining or creating a group topology). The configuration group generator 210 may also send instructions to the configuration processor 207 to assign local IP addresses to the physical resources associated with the configuration group(s) that may be used by a gateway (e.g., the service gateway A 120) within the distributive computing network 108 to route traffic to the resources.

Additionally, the configuration group generator 210 stores configuration groups by configuration type, resource, and/or any other classification type. In examples where configuration groups may be included as subsets of higher level configuration groups, the configuration group generator 210 may store the relationship between the configuration groups within a service database 212. The subset relationships between the configuration groups may be used by the configuration group generator 210 to create and/or define a group topology. The service database 212 may be implemented by EEPROM, RAM, ROM, and/or any other type of memory. Further, the configuration group generator 210 may store which service implementations and/or runtime environments correspond to which configuration groups and associated resources in the service database 212.

For example, the resource processor 206 and/or the configuration processor 207 may determine from the resource allocation information that a service is to be hosted on three servers at three different locations. The resource processor 206 and/or the configuration processor 207 may also determine that the resource allocation information specifies that two configuration types are to be created. The first configuration type specifies that the service is to be implemented on the first server using the Spanish language and the service is to be implemented on the second and third servers using the English language. Also, the second configuration type specifies that the service is to be implemented on the first and the second servers using a production version of the service while a development version of the service is to be implemented on the third server. The configuration processor 207 sends this configuration information to the configuration group generator 210 to allocate the servers to the corresponding configuration groups (e.g., the first server to the Spanish language group and to the production version group, the second server to the English language group and to the production version group, and the third server to the English language group and to the development version group).

Further, in the above example, the production version of the service may be implemented by a first service implementation (e.g., environment) that may be configured to host the service for a large population of customers. The first service implementation may include a payment procurement system. However, the development version may be implemented by a second service implementation that does not include a functional payment and procurement system. The configuration group generator 210 stores which service implementation is to be hosted by which resources associated with the corresponding configuration group(s).

In this relatively simple example, the client responsible for developing the service can quickly access the servers based on configuration type and/or group. For example, if the client needs to update part of the service that uses the Spanish language, the client can send a request to view the servers grouped by the language configuration type to the distributive computing network manager 112. The client can than easily determine that the first server is the server that is to receive the update.

Upon creating and allocating resources to configuration groups, the example resource identifier 208 of FIG. 2 stores information that references which configuration groups are hosted by which resources to the resource database 209. Clients may access the configuration group information by sending a request to the service request receiver 204. The service request receiver 204 then forwards the request to the resource processor 206 and/or the resource identifier 208 to access the resource database 209 and returns a list of resources associated with a configuration type specified by the client in the request. Upon viewing the configuration group information, the clients may send updates, modifications, additions, etc. via the service request receiver 204 to update the service based on the sent information. Alternatively, in some examples, the clients may access the resource database 209 via the resource processor 206 to use the configuration group information to access the resources associated with a desired configuration group and update, modify, add, etc. to the service hosted by those resources.

Further, the resource processor 206, configuration processor 207, resource identifier 208, and/or the configuration group generator 210 updates allocations of resources to configuration groups stored in the resource database 209 based on changes in allocations of resources within the distributive computing network 108. For example, if the service provider 114 reduces a hosted service from three servers to two servers in the distributive computing network 108, the resource identifier 208 and/or the configuration group generator 210 adjusts the configuration groups associated with the service so that each configuration group corresponds to a portion of the two remaining servers. Similarly, if the service provider 114 increases the number of servers hosting the service to four servers in the distributive computing network 108, the resource identifier 208, and/or the configuration group generator 210 adjusts the configuration groups so that the configuration groups are allocated among the four servers.

Additionally, the example resource processor 206 of FIG. 2 determines communication paths (e.g., routing paths) to resources associated with each configuration group. The routing information may be stored with the configuration group information within the resource database 209 and/or the service database 212. The routing information may also be updated in routing tables and forwarded to routing devices within the distributive computing network 108. For example, the service gateway A 120 may receive the routing information and use this information to forward requests from clients and/or customers to the resources associated with the appropriate configuration group.

Additionally, the example resource processor 206 may receive service deployment information originating from the service provider 114 via the service provider interface 202. The resource processor 206 may forward the deployment information associated with a runtime technology to a runtime manager 220 that configures the resources to host a service with the specified runtime technology. Further, the resource processor 206 may forward deployment information associated with parameters (e.g., implementations and/or environments) for hosting a service to a route manager 216 that configures resources for hosting the service in the specified environment. The deployment information associated with the parameters may also be forwarded to the configuration group generator 210 to associate each configuration group with the appropriate service implementation.

To manage the configuration groups within the distributive computing network 108, the example distributive computing network manager 112 of FIG. 2 includes a configuration group manager 214. The example configuration group manager 214 receives updates from service provider 114 regarding changes to resource allocations of services. Alternatively, the configuration group manager 214 may poll resources within the distributive computing network 108 for any changes. Upon receiving an update, the configuration group manager 214 determines if the update affects any resources associated with one or more configuration groups by polling the configuration group generator 210, the configuration processor 207, and/or the resource processor 206. If a change in resources affects a configuration group, the resource processor 206, configuration processor 207, and/or the configuration group manager 214 is notified and the configuration group generator 210 then modifies the allocation of resources for the affected configuration group(s).

Additionally, the example configuration group manager 214 may receive service implementations for configuration group(s) from the configuration group generator 210 and configure the corresponding resource(s) to host the service implementations. Configuring the resources may include activating portion(s) of the service that may utilize certain applications and/or toolsets available within the resources and/or other portions of the distributive computing network 108. For example, a production version of an online business configuration group may include a service implementation of an active payment system. The configuration group manager 214 configures the resources hosting this service implementation to activate the payment system portion of the service so that customers may submit payment data. The payment system may be hosted on the same resource hosting the service and/or may be hosted on a different resource within the distributive computing network 108 that is associated with common toolsets including the payment system.

Further, the example configuration group manager 214 may provide access to certain configuration groups based on an authorization of a client. For example, a client may request to access resources associated with a configuration group. The received request may be forwarded from the service request receiver 204 to the resource processor 206. Upon receiving the request, the configuration processor 207 within the resource processor 206 determines which configuration type and which configuration group is associated with the request. The configuration processor 207 then forwards this information to the configuration group manager 214 to determine if the request is authorized to access the configuration group. The configuration group manager 214 may provide authorization by prompting the individual for security credentials. If the security credentials are verified by the configuration group manager 214, the configuration group manager 214 provides the individual with access to the requested configuration group by forwarding the request to the resource(s) associated with the requested configuration group, or alternatively, to the configuration group information stored in the service database 212 and/or the resource database 209.

To manage the routing of requests and/or traffic to resources based on configuration group access criteria, the example distributive computing network manager 112 of FIG. 2 includes the route manager 216. The example route manager 216 manages routing tables that specify how requests and/or traffic are routed to resources. The routing tables may be stored within a routing table cache 218. The routing table cache 218 may be implemented by EEPROM, RAM, ROM, and/or any other type of memory. Further, the service provider 114 may access the routine table cache 218 via a communication path and/or the service provider interface 202 to update, modify, add, and/or delete portions of the routing tables based on routing configurations within the distributive computing network 108.

The example route manager 216 of FIG. 2 receives configuration group information from the resource processor 206 and determines a route to the resource(s) hosting a service associated with the configuration group. In the example of FIG. 1, the route may include a path from the router 110 to the physical resources 128 via the service gateway A 120. In other words, the route manager 216 specifies the routes from a gateway to resources based on which resources are allocated to each configuration group. The route manager 216 may determine which traffic and/or requests are to be routed to a configuration group based on authorization information specified within the configuration group information. The authorization information may specify, for example, that traffic from customers and/or service users are to be routed to configuration groups associated with a production version of the service. Similarly, the authorization information may specify that individuals associated with a client may be routed to configuration groups associated with a test and/or development version of a service.

The route manager 216 may locate authorization information within the routing tables by a source IP address associated with a request. For example, requests and/or traffic from certain source IP addresses may be routed to a production version of a service, while requests from other source IP addresses may be routed to a development version of a service. The route manager 216 may cross-reference the source IP addresses to IP addresses of resources hosting the service associated with the corresponding configuration group. In this manner, traffic received by the distributive computing network 108 may be routed to the appropriate configuration group resource(s) hosting the requested service. In other examples, the route manager 216 may use the destination IP address associated with a request to route the request to the requested configuration group resource(s).

Additionally, the example route manager 216 may update routing tables when allocations of resources are modified. Upon receiving an update to an allocation of resources, the resource processor 206 of FIG. 2 sends the route manager 216 the new allocation of resources for the affected configuration group(s). The route manager 216 then updates routing table(s) within the routing table cache 218 with the new allocation of resources reflecting which configuration groups are allocated to which of the resources.

Furthermore, the example route manager 216 of FIG. 2 routes requests that have been authenticated by the configuration group manager 214 to the appropriate configuration group. For example, a request from a client to access a development version of a service is first verified by the configuration group manager 214. The configuration group manager 214 then forwards the authenticated request to the route manager 216. The route manager 216 accesses the routing table cache 218 to determine which route(s) correspond to the configuration group associated with the request. The example route manager 216 then forwards the request on the determined route(s) to the desired configuration group resources.

To manage the configuration of runtime technologies used to operate a service, the example distributive computing network manager 112 of FIG. 2 includes the runtime manager 220. Consider an example in which the example runtime manager 220 receives an instruction from the resource processor 206 indicating that a service is to be hosted within one or more resources. The runtime manager 220 determines service type(s) of the service to be hosted by the one or more resources. The runtime manager 220 may determine different service type(s) of the service to be hosted within different resource(s) associated with a configuration group. The example runtime manager 220 may then determine if a runtime technology was specified by a client. If a client specified a runtime technology, the example runtime manager 220 accesses a runtime database 222 for the requested runtime technology and applies that runtime technology to the resource(s) that are to host the service. The runtime manager 220 may also store a reference as to which runtime technology is operating the service for each configuration group. The runtime database 222 may be implemented by EEPROM, RAM, ROM, and/or any other type of memory. Further, the service provider 114 may add, remove, and/or modify runtime technologies stored within the runtime database 222 via a communication path and/or through the service provider interface 202.

A runtime technology is a software and/or firmware implementation of a runtime engine that may be used to operate a service and/or an application. A runtime technology may be used as a foundation for developing or deploying a service and may be implemented by, for example, a Tibco™ runtime engine, an Oracle Weblogic™ runtime engine, an IBM Websphere™ runtime engine, a UNIX™ runtime engine, a Java™ runtime engine, etc. The example runtime manager 220 deploys client requested runtime technologies to resource(s) that are to host service(s). As a result, multiple runtime technologies may be deployed across one or more resources within the distributive computing network 108.

In examples where a client may not specify a runtime technology, the runtime manager 220 may determine a runtime technology by cross-referencing the service type to a list of appropriate runtime technologies. The example runtime manager 220 may then deploy the selected runtime to the resources that are to host the service for each configuration group. The runtime manager 220 then stores a reference as to which runtime technology is operating the service for each configuration group.

While an example manner of implementing the distributive computing network manager 112 is depicted in FIG. 2, one or more of the interfaces, data structures, elements, processes and/or devices illustrated in FIG. 2 may be combined, divided, rearranged, omitted, eliminated and/or implemented in any other way. For example, the example service provider interface 202, the example service request receiver 204, the example resource processor 206, the example configuration processor 207, the example resource identifier 208, the example resource database 209, the example configuration group generator 210, the example service database 212, the example configuration group manager 214, the example route manager 216, the example routing table cache 218, the example runtime manager 220, and/or the example runtime database 222 illustrated in FIG. 2 may be implemented separately and/or in any combination using, for example, machine-accessible or readable instructions executed by one or more computing devices and/or computing platforms (e.g., the example processing platform P100 of FIG. 10).

Further, the example service provider interface 202, the example service request receiver 204, the example resource processor 206, the example configuration processor 207, the example resource identifier 208, the example resource database 209, the example configuration group generator 210, the example service database 212, the example configuration group manager 214, the example route manager 216, the example routing table cache 218, the example runtime manager 220, the example runtime database 222 and/or, more generally, the distributive computing network manager 112 may be implemented by hardware, software, firmware and/or any combination of hardware, software and/or firmware. Thus, for example, any of the example service provider interface 202, the example service request receiver 204, the example resource processor 206, the example configuration processor 207, the example resource identifier 208, the example resource database 209, the example configuration group generator 210, the example service database 212, the example configuration group manager 214, the example route manager 216, the example routing table cache 218, the example runtime manager 220, the example runtime database 222 and/or, more generally, the distributive computing network manager 112 can be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software implementation, at least one of the example service provider interface 202, the example service request receiver 204, the example resource processor 206, the example configuration processor 207, the example resource identifier 208, the example resource database 209, the example configuration group generator 210, the example service database 212, the example configuration group manager 214, the example route manager 216, the example routing table cache 218, the example runtime manager 220, and/or the example runtime database 222 are hereby expressly defined to include a tangible medium such as a memory, DVD, CD, etc. Further still, the example distributive computing network manager 112 of FIG. 2 may include one or more elements, processes and/or devices in addition to, or instead of, those illustrated in FIG. 2, and/or may include more than one of any or all of the illustrated elements, processes and devices.

Figure 3:
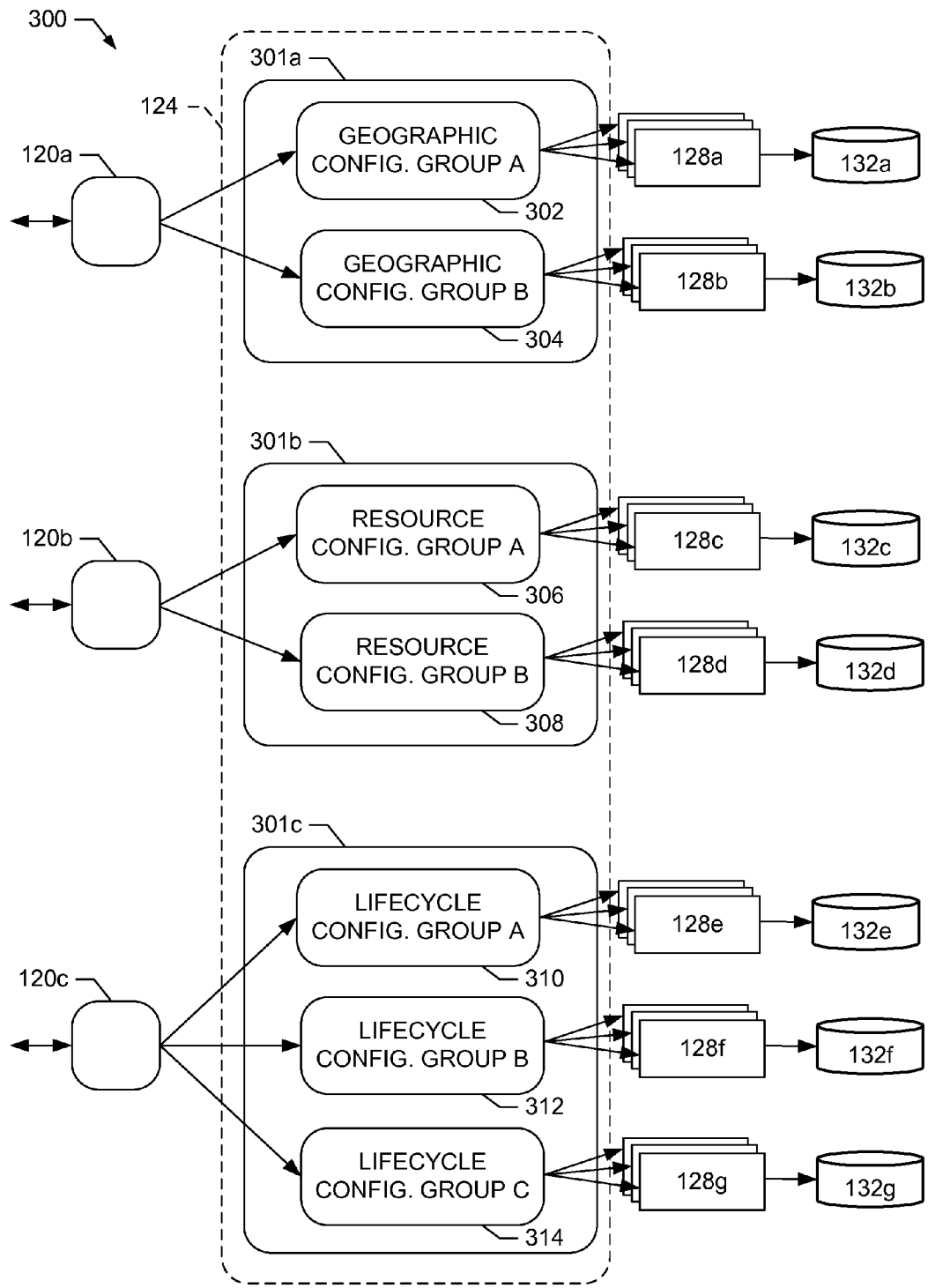
FIG. 3 illustrates an organization of configuration groups associated with respective configuration types.

FIG. 3 illustrates an organization 300 of configuration groups 302-314 associated with respective configuration types 301a-c. The configuration groups 302-314 and the respective configuration types 301a-c are logically organized within the group topology 124 of FIG. 1. The configuration types 310a-c are logically coupled to respective service gateways 120a-c (e.g., service implementations and/or environments) that correspond to the service gateway A 120 of FIG. 1. In other examples, the configuration types 301a-c may be communicatively coupled to a single service gateway (e.g., the service gateway A 120).

The example of FIG. 3 also shows logical connections between the configuration groups 302-314 and respective resources 128a-g and 132a-g. In the example of FIG. 1, the service gateway 120 is communicatively coupled to the resources 128 and 132. The example of FIG. 3 shows that the group topology 124 may partition the resources 128 and 132 based on the configuration groups 302-314 for the different configuration types 301a-c.

While FIG. 3 shows three examples of configuration types 301a-c (namely, geographic, resource configuration and lifecycle), the distributive computing network manager 112 may manage additional configuration types such as, for example, configuration types associated with: a server operating system, a runtime technology, bandwidth, and/or any other configuration type specified by a client. Additionally, while each configuration type 301a-c includes respective configuration groups 302-314, each of the configuration types 301a-c may include fewer or additional configuration groups. Also, while the configuration groups 302-314 are logically connected to the respective resources 128a-f and 132a-f, some of the configuration groups 302-314 in other examples may only be coupled to the respective physical resources 128a-f or the respective data resources 132a-f.

In the example of FIG. 3, the configuration type 301a corresponds to a geographic location configuration type and includes the geographic configuration group A 302 and the geographic configuration group B 304. The geographic configuration group A 302 may correspond to the resources 128a and 132a located in Dallas, Tex. while the geographic configuration group B 304 may correspond to the resources 128b and 132b located in San Francisco, Calif. A client may access the physical resources 128a located in Dallas by viewing the configuration type 301a and selecting the location configuration group A 120 and/or by requesting the location configuration group A 302. In this manner, the client may make a location specific modification to the service hosted by the physical resources 128a.

The example configuration type 301b corresponds to a resource configuration type and includes the resource configuration group A 306 and the resource configuration group B 308. The resource configuration groups 306 and 308 enable a client to specify, for example, a primary database and a backup database for a hosted service. The resource configuration group A 306 is associated with the physical resources 128c located at different locations that are communicatively coupled to the data resource 132c which may be virtualized as a primary database. The resource configuration group B 308 is associated with the physical resources 128d located at different locations that are communicatively coupled to the data resource 132d which may be virtualized as a secondary (e.g., a backup) database.

The example configuration type 301c corresponds to a service lifecycle configuration group type and includes a lifecycle configuration group A 310, a lifecycle configuration group B 312, and a lifecycle configuration group C 314. The lifecycle configuration groups 310-314 enable the distributive computing network 108 of FIG. 1 to support different phases of a service development for a subscribing client. The lifecycle configuration group A 310 corresponds to physical resources 128e and data resources 132e. The lifecycle configuration group B 312 corresponds to the physical resources 128f and the data resources 132f. The lifecycle configuration group C 314 corresponds to physical resources 128g and data resources 132g.

While the physical resources 128a-g are shown as separate portions of the physical resources 128 of FIG. 1, the physical resources 128a-b, for example, may comprise the physical resources 128. Similarly, the physical resources 128c-d may comprise the physical resources 128. The difference between the physical resources 128a-b and the physical resources 128c-d is that the physical resources 128a-b are partitioned from the physical resources 128 based on geographic location while the physical resources 128c-d are partitioned from the same physical resources 128 based on resource utilization. Thus, the distributive computing network manager 112 enables clients to partition the same resources differently based on configuration type(s). Further, the exact allocations of the number of servers within the physical resources 128a may not match the allocation of servers within the physical resources 128c. For example, the physical resources 128d may include some of the same servers partitioned for the physical resources 128a.

The configuration processor 207 within the distributive computing network manager 112 of FIG. 2 provides the organization 300 of the configuration groups 302-314 within the respective configuration types 301a-c for a subscribing client. The client may submit resource allocation information to the configuration processor 207 to organize the physical resources 128a-128g and the data resources 132a-g by corresponding configuration groups 302-314 regardless as to how the distributive computing network manager 112 changes the allocation of resources. By having the different configuration types 301a-c correspond to the same physical resources 128, the client can manage a service hosted by the physical resources 128 by implementing modifications, additions, and/or deletions that may be appropriate for some configuration groups but not necessarily other configuration groups. Further, the client does not need to track which resources are allocated to each configuration group because the distributive computing network manager 112 maintains the allocation records that may be accessed by the client. Additionally, the distributive computing network manager 112 may change and/or scale the resources while maintaining at least some allocation of resources for each configuration group 302-314. This ensures a client has resources to support every desired service implementation of a service.

Figure 4:
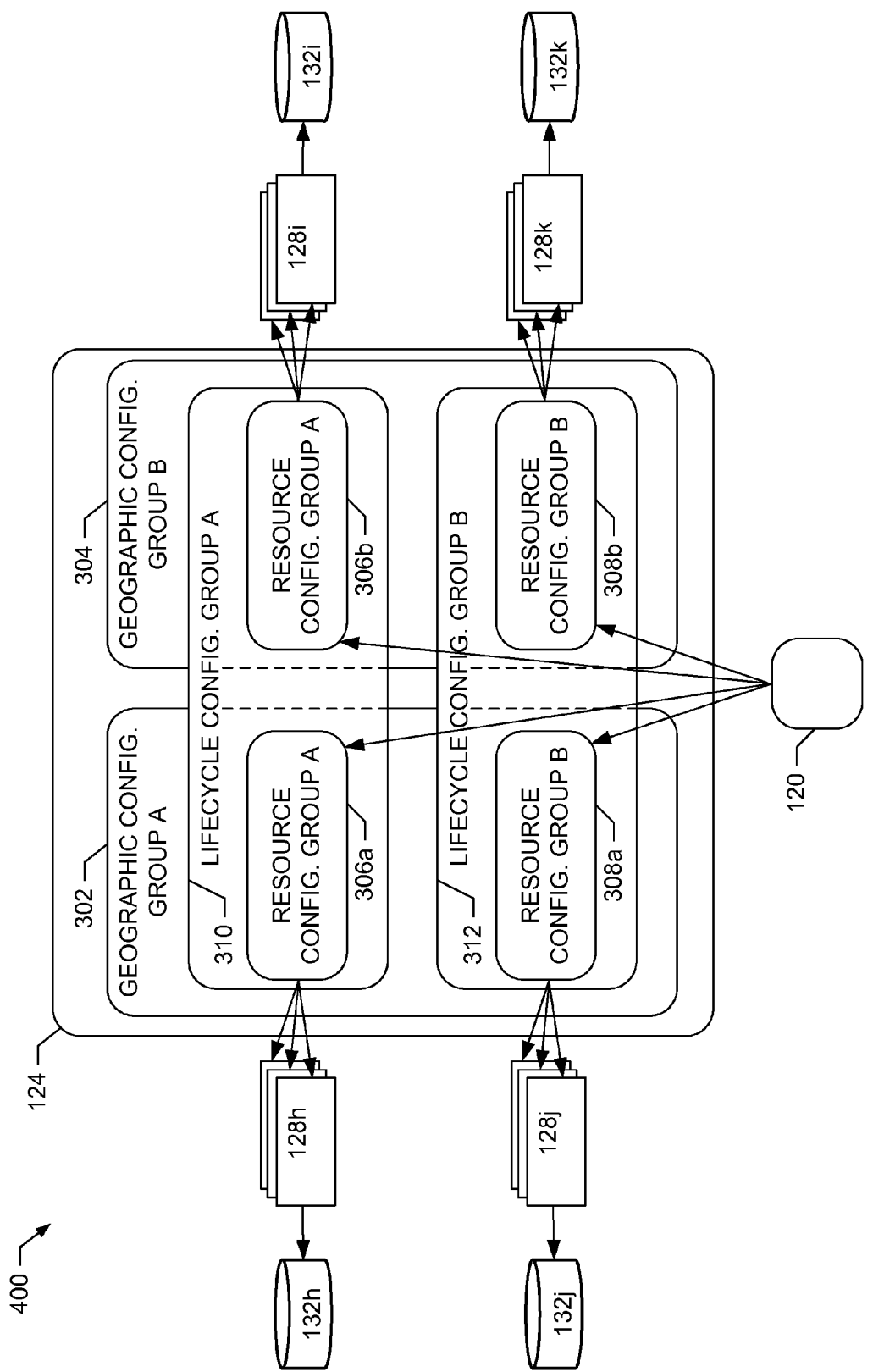
FIG. 4 illustrates an organization of the configuration groups of FIG. 3 within a hierarchical configuration type framework associated with the group topology of FIG. 1.

FIG. 4 illustrates a hierarchical organization 400 of the configuration groups 302-308 of FIG. 3 associated with the group topology 124 of FIG. 1. For brevity, the lifecycle configuration group 314 of FIG. 3 is not shown in FIG. 4. Additionally, for clarity, the configuration types 301a-c are not explicitly shown in FIG. 4. However, the configuration groups 302-308 are hierarchically organized by configuration type. For example, the geographic configuration groups 302 and 304 may be at the highest hierarchical level, the lifecycle configuration groups 310 and 312 are at the next lower hierarchical level, and the resource configuration groups 306a-b and 308a-b are at the lowest hierarchical level.

In the example of FIG. 4, a client may specify that some configuration groups are subgroups of other configuration groups. By specifying a hierarchical configuration group structure, a client can efficiently manage configuration groups that may have overlapping resources. While FIG. 4 shows one manner in which configuration groups may be structured within other configuration groups, other examples may include the configuration groups 302-312 structured differently and/or may include additional configuration types and/or groups.

In the example of FIG. 4, a resource configuration group A 306a is a subgroup of the lifecycle configuration group A 310, which is a subgroup of the geographic configuration group A 302. In other words, resources 128h and 132h associated with the resource configuration group A 306a may be located at Dallas, Tex. (e.g., the geographic configuration group A 302) and may be associated with a production lifecycle (e.g., the lifecycle configuration group A 310). Similarly, resources 128i and 132i associated with a resource configuration group A 306b are located at San Francisco, Calif. (e.g., the geographic configuration group B 304) and may be associated with the production lifecycle (e.g., the lifecycle configuration group A 310).

Further, a resource configuration group B 308a is associated with resources 128j and 132j that are located at Dallas, Tex. which correspond to the geographic configuration group A 302. Further, the resource configuration group B 308a is a subgroup of the lifecycle configuration group B 312 (e.g., a development lifecycle). Additionally, a resource configuration group B 308b is associated with resources 128k and 132k that are located at San Francisco, Calif. which correspond to the geographic configuration group B 304. Further, the resource configuration group B 308b is a subgroup of the lifecycle configuration group B 312.

Additionally, the service gateway A 120 of FIG. 1 may be communicatively coupled to the resources 128h-k and 132h-k in the corresponding configuration groups 302-312. The physical resources 128h-k are portions of the physical resources 128 of FIG. 1 and the data resources 132h-k are portions of the physical resources 132 of FIG. 1. Alternatively, a service gateway, environment, and/or implementation may be associated with each configuration group 302-312. A client may access any of the physical resources 128h-k via the service gateway A 120. Then, by specifying the configuration group(s) in a request, the client may access the resources 128h-k and 132h-k associated with the specified configuration group(s).

Figure 5:
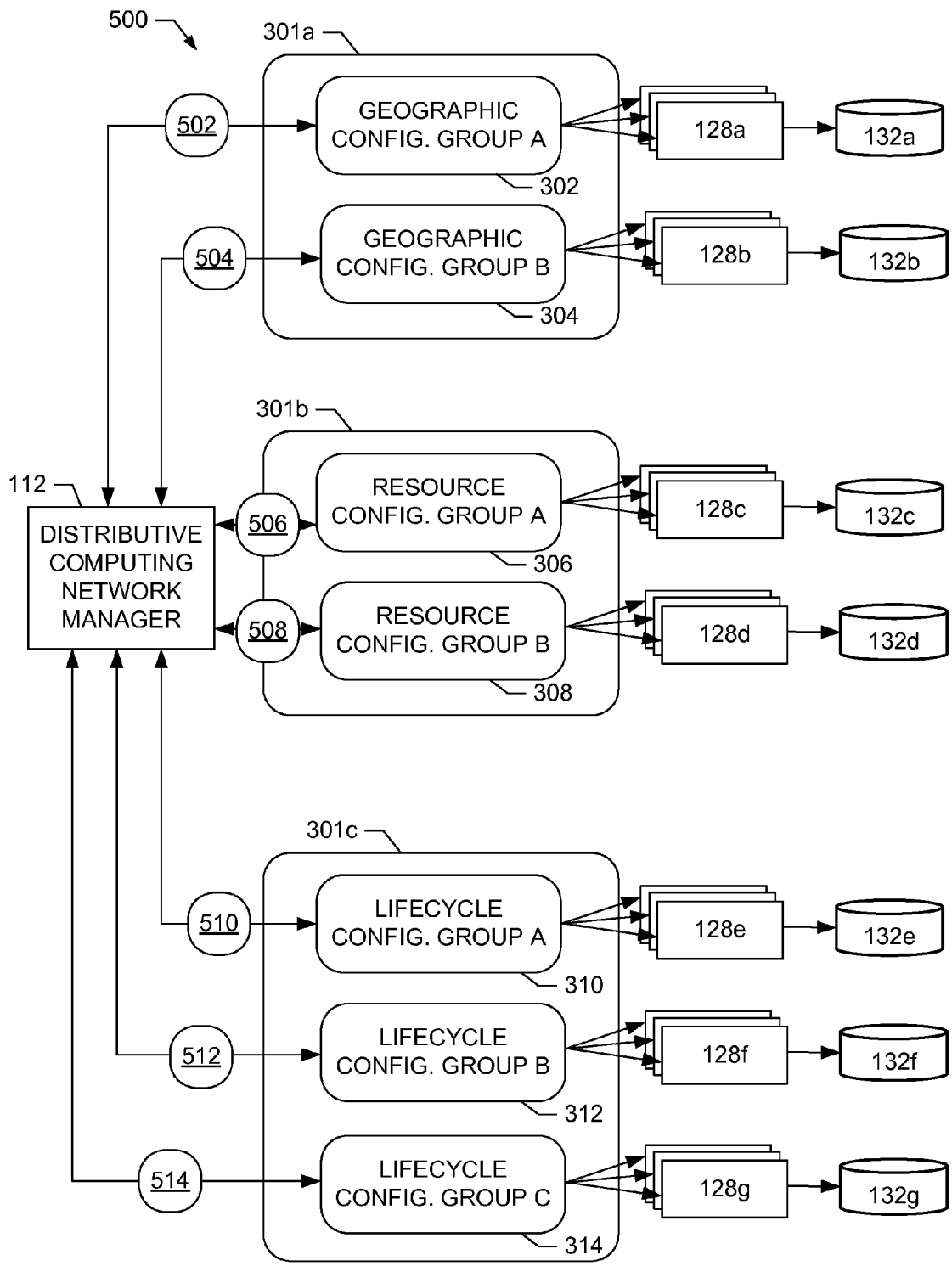
FIG. 5 illustrates an organization of the configuration types, the configuration groups, the physical resources, and the data resources of FIG. 3 associated with respective service implementations.

FIG. 5 illustrates an organization 500 of the configuration types 301a-c, the configuration groups 302-314, the physical resources 128a-g, and the data resources 132a-g of FIG. 3 associated with respective service implementations 502-514. For brevity, the group topology 124 is not shown. Each of the service implementations 502-514 is logically connected to the distributive computing network manager 112 of FIGS. 1 and 2. The service implementations 502-514 are also logically connected to the configuration types 301a-c and/or the configuration groups 302-314. Further, each of the service implementations 502-514 may be logically connected to a service gateway (e.g., the service gateways 120a-c). In other examples, each of the service implementations 502-514 may be associated with and/or configured by a service gateway. While the example of FIG. 5 shows different service implementations 502-514 for the configuration groups 302-314, other examples may include one service implementation for two or more configuration groups.

The example service implementations 502-514 define functions and/or features of a service that is hosted by the respective resources 128a-g and 132a-g based on the logical connection to the configuration types 301a-c and/or the configuration groups 302-314. The distributive computing network manager 112 simplifies localized configurations of the service hosted for the configuration groups 302-314 by enabling the resources 128a-g and/or 132a-g of the distributive computing network 108 to perform functions defined by the respective service implementations 502-514. In some examples, the service implementations 502-514 may be specifications (e.g., features, functions, toolset properties, parameters, etc.) of portions of a service that are implemented by the resources 128a-g and/or 132a-g. For example, if a hosted service is an online business, service implementations may include payment systems, credit card processing systems, database management tools, service development tools, merchandise (e.g., inventory) databases, language implementations, terms of service requirements, etc. A client may specify, for example, that the service implementation 510 is to include only database management tools as part of the hosted service associated with the lifecycle configuration group A 310. Further the client may specify, for example, the service implementation 512 is to include payment systems and credit card processing systems as part of the hosted service associated with the lifecycle configuration group B 312. Thus, users that access the service through the lifecycle configuration group A 310 will only be able to utilize the database management tools associated with the service and users that access the service through the lifecycle configuration group B 312 will be able to utilize the payment systems and credit card processing systems associated with the service.

The example of FIG. 5 shows that a client may specify the service implementations 502-514 associated with the respective configuration groups 302-314. For example, the geographic configuration group A 302 is associated with the service implementation 502 while the geographic configuration group B 304 is associated with the service implementation 504. In another example, the service implementation 502 may specify different hosting parameters that may coincide with hosting the service in Dallas compared to hosting parameters specified within the service implementation 504 that would coincide with hosting the service in San Francisco. Similarly, the resource configuration group A 306 is associated with the service implementation 506 while the resource configuration group B 308 is associated with the service implementation 508. Further, the lifecycle configuration group A 310 is associated with the service implementation 510, the lifecycle configuration group B 312 is associated with the service implementation 512, and the lifecycle configuration group C 314 is associated with the service implementation 514.

Figure 6:
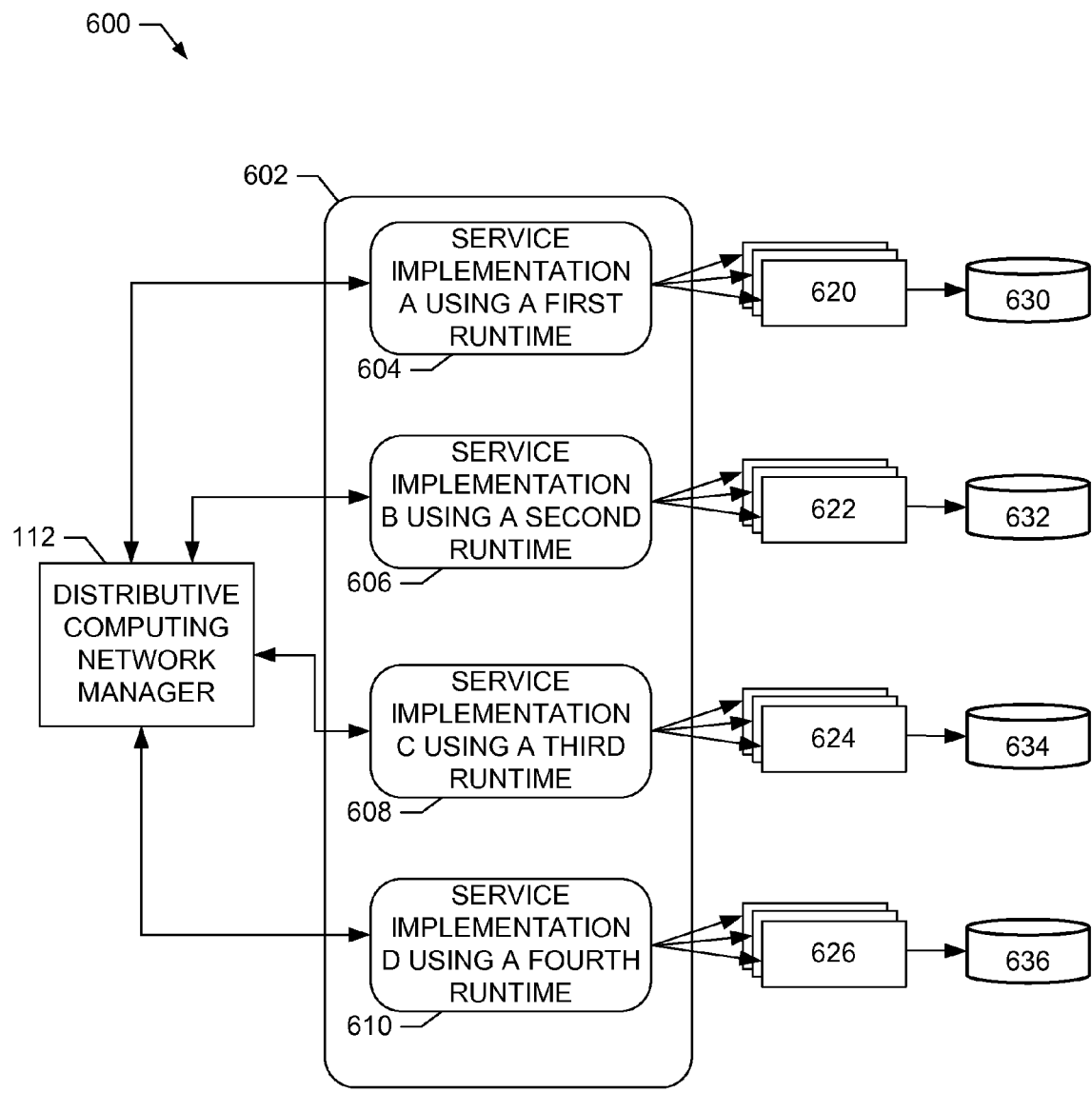
FIG. 6 illustrates a group topology associated with a service that includes service implementations hosted by different runtime technologies.

FIG. 6 illustrates a group topology 602 associated with a service that includes four service implementations 604-610 hosted by different runtime technologies. For brevity, configuration types and configuration groups associated with the service implementations 604-610 are not shown. The group topology 602 is similar to the group topologies 124 and 126 of FIG. 1 and includes the service implementations 604-610, which are similar to the service implementations 502-514 of FIG. 5. Each of the service implementations 604-610 are logically connected to respective physical resources 620-626 and data resources 630-636. Further, each of the service implementations 604-610 are logically connected to the distributive computing network manager 112 of FIGS. 1 and 2.

The example of FIG. 6 shows the runtime manager 220 within the distributive computing network manager 112 managing different runtime technologies for a service. In other examples, the runtime manager 220 may mange different runtime technologies for different services. Because the runtime manager 220 is capable of managing different runtime technologies, different runtime technologies can be applied to different service types within the distributive computing network 108 without having to partition the distributive computing network 108. Further, by managing multiple runtime technologies within the distributive computing network 108, the example runtime manager 220 is capable is migrating a service relatively seamlessly to a different runtime technology based on a request from a client. The runtime technologies may be used as a foundation for developing or deploying a service and may be implemented by, for example, a Tibco™ runtime engine, an Oracle Weblogic™ runtime engine, an IBM Websphere™ runtime engine, a UNIX™ runtime engine, a Java™ runtime engine, etc.

In the example of FIG. 6, the service implementation A 604 is operated by a first runtime technology, the service implementation B 606 is operated by a second runtime technology, the service implementation C 608 is operated by a third runtime technology, and the service implementation D 610 is operated by a fourth runtime technology. Each of these runtime technologies is shown to be operating on the respective physical resources 620-626. In some examples, portions of the physical resources 620-626 may share the same server, processor, and/or computing resource despite having a different runtime technology. In these examples, the server, the processor, and/or the computing resource may be partitioned such that part of the server, the processor, and/or the computing resource is configured to operate a first runtime technology and part of the server, the processor, and/or the computing resource is configured to operate a second, different runtime technology.

FIGS. 7A, 7B, 8 and 9 are flowcharts representative of example machine-accessible instructions that may be executed by a machine to implement the example service provider interface 202, the example service request receiver 204, the example resource processor 206, the example configuration processor 207, the example resource identifier 208, the example resource database 209, the example configuration group generator 210, the example service database 212, the example configuration group manager 214, the example route manager 216, the example routing table cache 218, the example runtime manager 220, the example runtime database 222 and/or, more generally, the distributive computing network manager 112 of FIGS. 1 and/or 2. The example instructions of FIGS. 7A, 7B, 8 and/or 9 may be carried out by a processor, a controller and/or any other suitable processing device. For example, the example instructions of FIGS. 7A, 7B, 8 and/or 9 may be embodied in coded instructions stored on any tangible computer-readable medium such as a flash memory, a CD, a DVD, a floppy disk, a ROM, a RAM, a programmable ROM (PROM), an electronically-programmable ROM EPROM, EEPROM, an optical storage disk, an optical storage device, magnetic storage disk, a magnetic storage device, and/or any other tangible or non-tangible medium that can be used to carry or store program code and/or instructions in the form of methods or data structures, and which can be accessed by a processor, a general-purpose or special-purpose computer, or other machine with a processor (e.g., the example processor platform P100 discussed below in connection with FIG. 10). Combinations of the above are also included within the scope of computer-readable media. Alternatively, some or all of the example instructions represented by FIGS. 7A, 7B, 8 and/or 9 may be implemented using any combination(s) of ASIC(s), PLD(s), FPLD(s), discrete logic, hardware, firmware, etc.

Figure 7A:
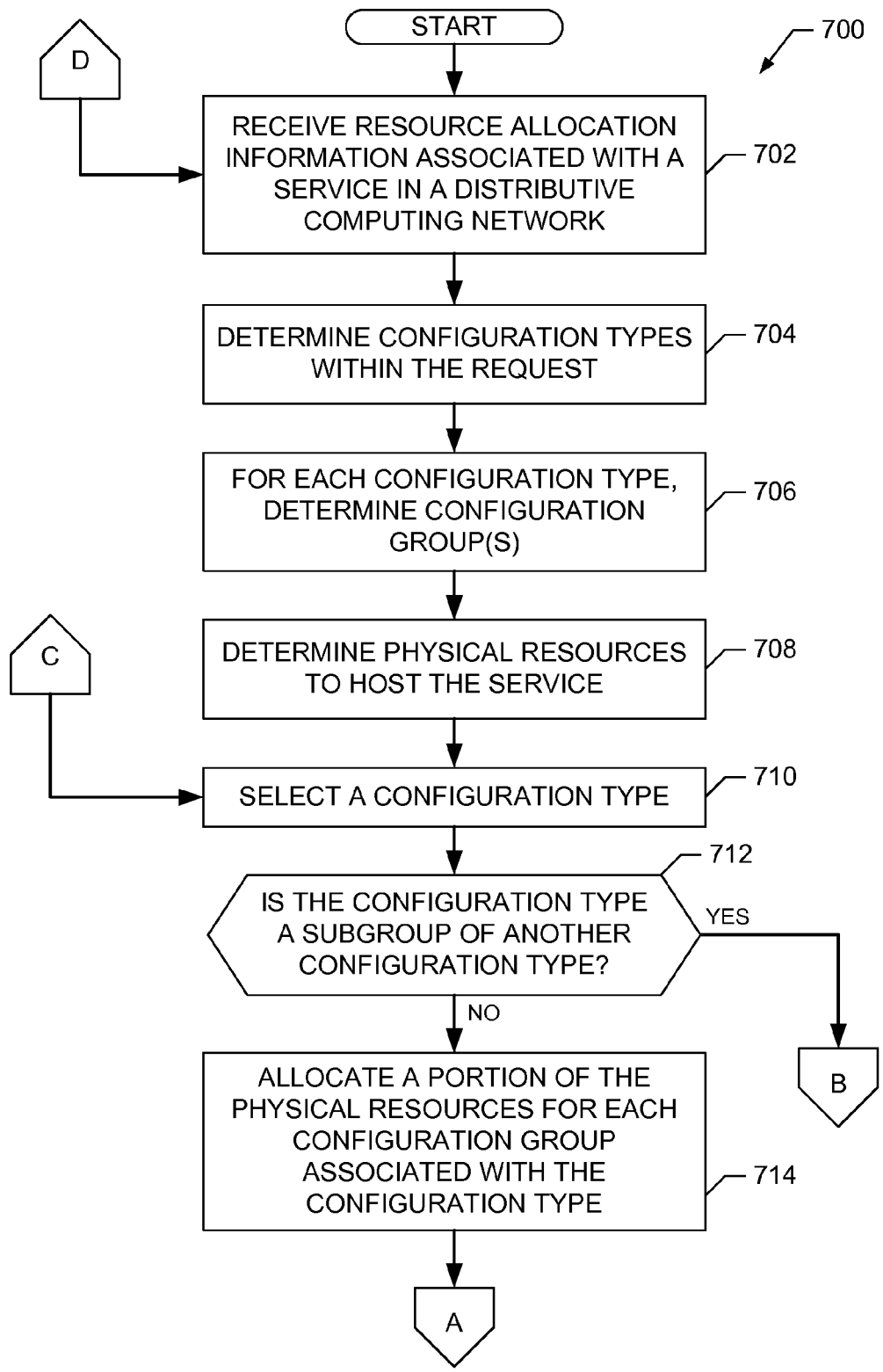
FIGS. 7A, 7B, 8, and 9 are flowcharts representative of example machine-accessible instructions that may be executed to implement the example distributive computing network manager of FIGS. 1, 2, 3 and/or 4.
Figure 7B:
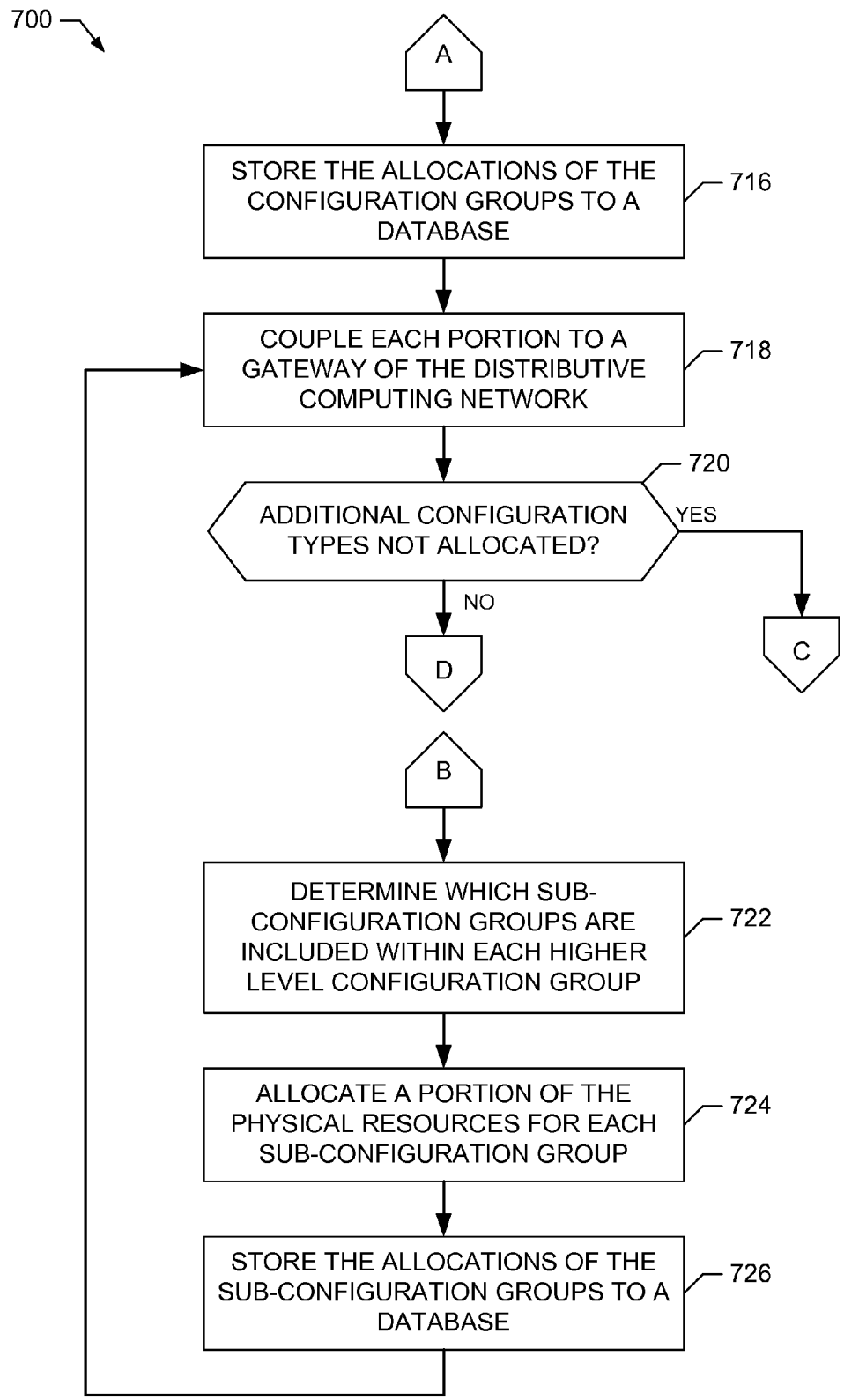
Figure 8:
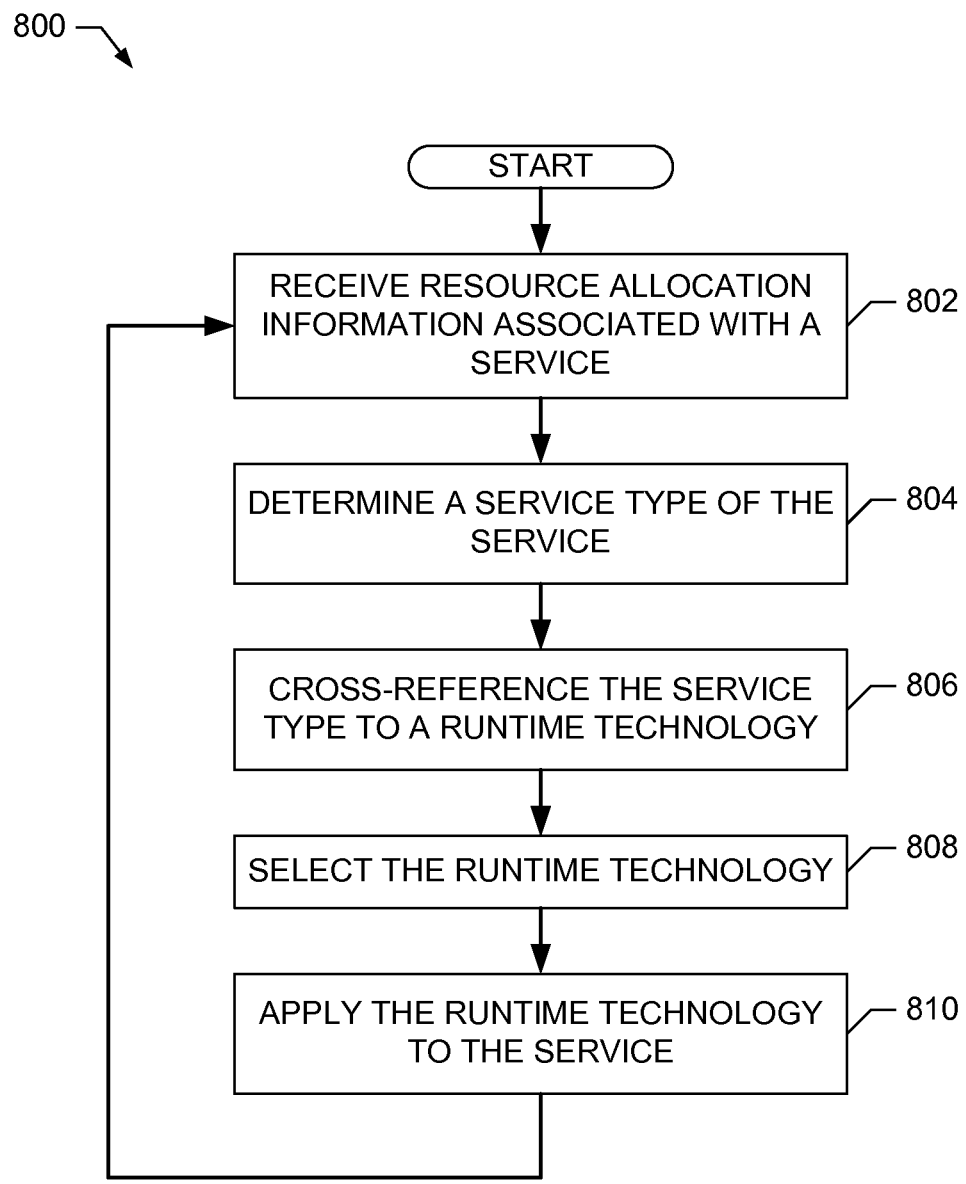

Also, some or all of the example instructions represented by FIGS. 7A, 7B, 8 and/or 9 may instead be implemented using manual operations or as any combination of any of the foregoing techniques, for example, any combination of firmware, software, discrete logic and/or hardware. Furthermore, many other methods of implementing the example instructions of FIGS. 7A, 7B, 8 and/or 9 may be employed. For example, the order of execution of the blocks may be changed, and/or one or more of the blocks described may be changed, eliminated, sub-divided, or combined. Additionally, any or all of the example instructions of FIGS. 7A, 7B, 8 and/or 9 may be carried out sequentially and/or carried out in parallel by, for example, separate processing threads, processors, devices, discrete logic, circuits, etc.

The example instructions 700 of FIGS. 7A and 7B create one or more configuration group(s) for a service hosted within the distributive computing network 108 of FIG. 1 based on resource allocation information received from a client. Multiple instances of the example instructions 700 may be executed in parallel or series to create configuration groups for different services hosted within the distributive computing network 108. Further, the example instructions 700 may be executed when allocations of resources are modified that affect corresponding configuration groups.

The example instructions 700 of FIG. 7A begins when the service request receiver 204 of FIG. 2 receives resource allocation information associated with a service hosted by a distributive computing network (e.g., the distributive computing network 108 of FIG. 1) (block 702). Next, the resource processor 206 determines one or more configuration types specified within the request (block 704). Then, for each configuration type, the configuration processor 207 determines one or more configuration groups (block 706). The resource allocation information may include, for example, authorization levels for each configuration group, locations for resources associated with each configuration group, bandwidth requirements for each configuration group, operating system requirements for each configuration group, a runtime technology to operate the service within each configuration group, etc.

The example instructions 700 continue when the resource identifier 208 determines physical resource and/or data resources to host the service (block 708). The configuration group generator 210 then selects one of the identified configuration types (block 710) and determines if the configuration type is a subgroup (e.g., a subset) of anther configuration type (block 712). If the configuration type is not a subgroup, the configuration group generator 210 allocates a portion of the physical resources for each configuration group within the configuration type (block 714). Further, the configuration group generator 210 may allocate a portion of data resources to each configuration group.

The resource identifier 208 then stores the allocations of the resources to each configuration group to a database (e.g., the resource database 209 of FIG. 2) (block 716). Next, the configuration group generator 210, the configuration group manager 214, and/or the route manager 216 couples each portion of the physical resources associated with a configuration group to a gateway (e.g., the service gateways 120 and 122 of FIG. 1) within the distributive computing network 108 (block 718). The configuration group generator 210 then determines if there are additional configuration types that have not been allocated to the physical resources (block 720). If there are no additional configuration types, the service request receiver 204 receives resource allocation information associated with a different service hosted by a distributive computing network (block 702). However, if there are additional configuration types, the configuration group generator 210 selects a remaining un-allocated configuration type (block 710). Further, in examples where an allocation of resources is modified, the resource identifier 208 determines the modified and/or changed physical resources to host the service (block 708) and the configuration group generator 210 allocates the configuration groups to the modified physical resources (blocks 710-720).

If the configuration group generator 210 determines in block 712 that the configuration type is a subgroup, the configuration group generator 210 determines which sub-configuration groups are included within each higher level configuration group (block 722). The example configuration group generator 210 then allocates a portion of the physical resources for each sub-configuration group (block 724) and stores the allocations to a database (block 726). In the example of FIGS. 7A and 7B, the higher level configuration type may have the associated configuration groups allocated to the physical resources prior to allocating sub-configuration groups. In other examples, the configuration group generator 210 may allocate sub-configuration groups to the physical resources and structure the configuration group hierarchy as the configuration types are processed.

The configuration group generator 210, the configuration group manager 214, and/or the route manager 216 then couples each portion of the physical resources associated with each sub-configuration group to a gateway within the distributive computing network 108 (block 718). The configuration group generator 210 then determines if there are additional configuration types that have not been allocated to the physical resource (block 720). If there are no additional configuration types, the example instructions 700 loop back and the service request receiver 204 receives resource allocation information associated with a different service hosted by a distributive computing network (block 702). However, if there are additional configuration types, the configuration group generator 210 selects a remaining un-allocated configuration type (block 710).

FIG. 8 represents instructions 800 that may be implemented to deploy a runtime technology for a service hosted within the distributive computing network 108 of FIG. 1 based on resource allocation information received from a client. Multiple instances of the instructions 800 may be executed in parallel or series to deploy different runtime technologies for different services hosted within the distributive computing network 108. Further, the example instructions 800 may be executed when a client requests that a different runtime technology be deployed to operate a hosted service.

The example instructions 800 of FIG. 8 begins when the service request receiver 204 receives resource allocation information associated with a service that is to be hosted by a distributive computing network (e.g., the distributive computing network 108 of FIG. 1) (block 802). The runtime manager 220 then determines a service type of the service to be hosted (block 804). Next, the runtime manager cross-references the service type to a runtime technology (block 806) and selects the runtime technology (block 808). The example method 800 then applies the runtime technology to the service by deploying the runtime technology to the resources that are to host the service (block 810). Deploying the runtime technology may include applying the runtime technology to the service, installing the runtime technology to the resources and using the runtime technology to compile the service, loading the service through the runtime technology, and/or operating the service through the operation of the runtime technology.

The resources may be determined by the resource identifier 208 upon the service request receiver 204 receiving the resource allocation information. In some examples, the runtime manager 220 may deploy a different runtime technology for each configuration group associated with the service based on service implementations for each configuration group. In other example implementations where the resource allocation information may specify the runtime technology, the runtime manager determines if the distributive computing network 108 is capable of running the specified runtime technology. If the distributive computing network 108 is capable of running the specified runtime technology, the runtime manager 220 deploys the runtime technology to the resources determined to host the service (block 810). The example instructions 800 then loop back when the service request receiver 204 receives resource allocation information associated with a different service that is to be hosted by a distributive computing network (block 802).

Figure 9:
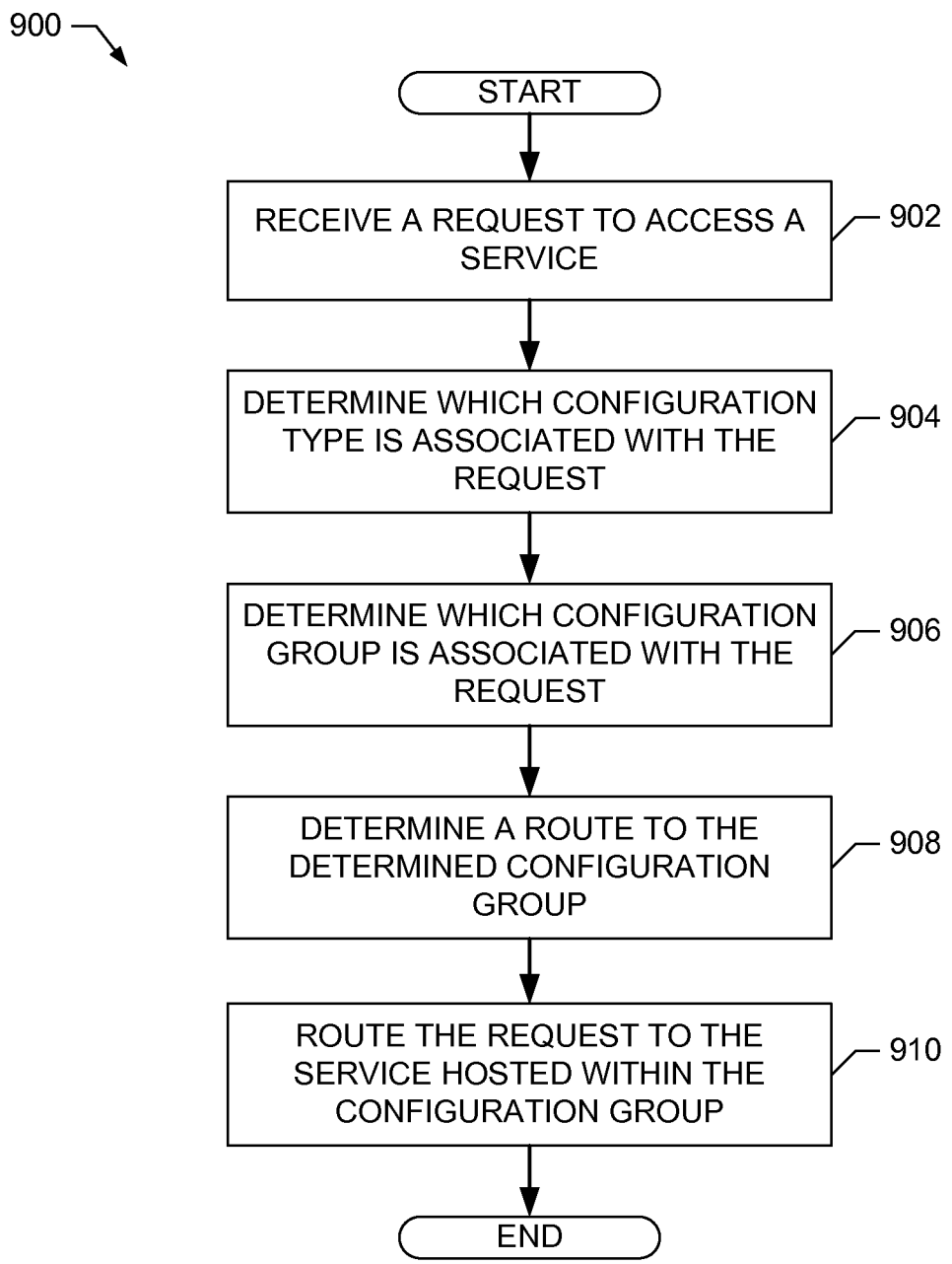

The example instructions 900 of FIG. 9 processes a request to access a service hosted within the distributive computing network 108 of FIG. 1. Multiple instances of the example instructions 900 may be executed in parallel or series to process requests to access the same and/or different services hosted within the distributive computing network 108. Further, the example instructions 900 may process a request to access the service, to use the service, and/or to modify the service.

The example instructions 900 of FIG. 9 begin when the service request receiver 204 receives a request to access a service hosted by the distributive computing network 108 of FIG. 1 (block 902). Next, the resource processor 206 determines which configuration type is associated with the request (block 904). The configuration processor 207 then determines which configuration group is associated with the request (block 906). The resource processor 206 may determine the configuration type and/or the configuration processor 207 may determine the configuration group by a destination IP address that may reference one or more resources hosting the service associated with a certain configuration type and/or group. Alternatively, the resource processor 206 may determine the configuration type and/or the configuration processor 207 may determine the configuration group by matching a source IP address associated with the request to a list of authorized IP addresses for each configuration type and/or group. If the source IP address is authorized to view more than one configuration group, the configuration group manager 214 may prompt the originator of the request to select a configuration group and/or type. Further, if the request is associated with a configuration group that has restricted access, the configuration group manager 214 may prompt the originator of the request for security credentials.

The route manager 216 then determines a route to the determined configuration group within the distributive computing network 108 (block 908). Next, the route manager 220 routes the request to the service hosted by the resources associated with the configuration group (block 910). The route manager 220 may route the request by sending the request to an IP address associated with the resource corresponding to the determined configuration group. Upon routing the request, the example instructions 900 loop back when the service request receiver 204 receives a request to access the same or a different service hosted by the distributive computing network 108 of FIG. 1 (block 902).

Figure 10:
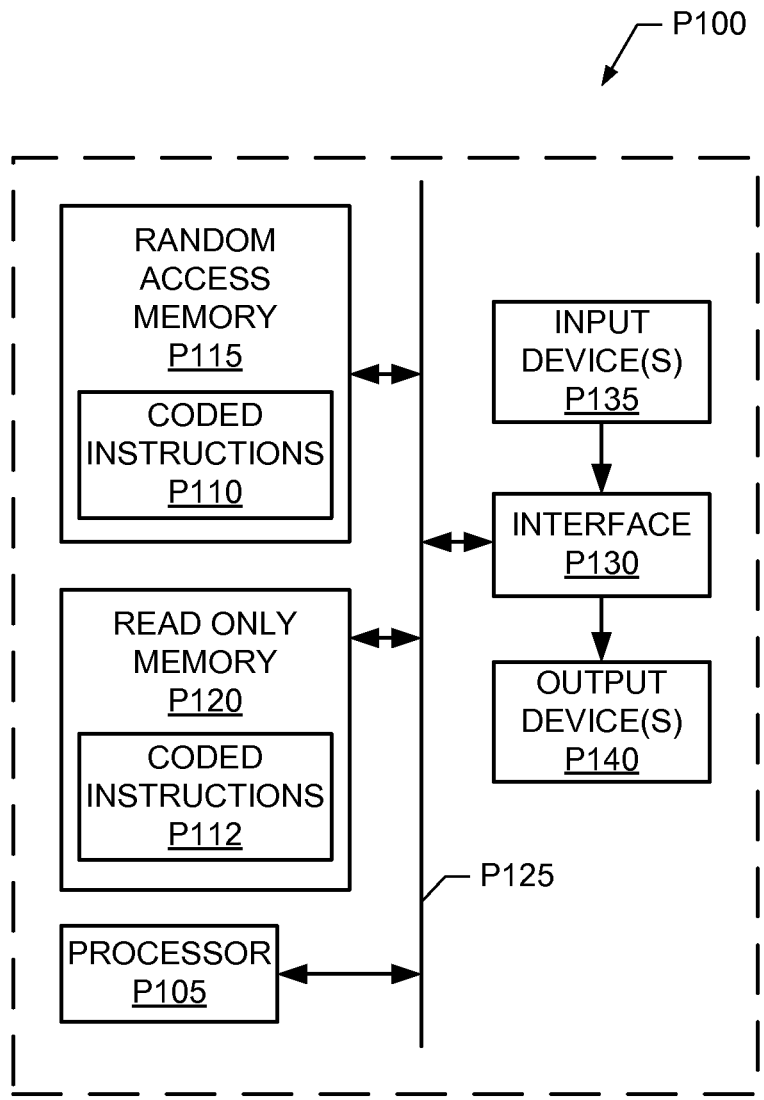
FIG. 10 is a schematic illustration of an example processor platform that may be used and/or programmed to execute the example instructions of FIGS. 7A, 7B, 8, and/or 9 to implement any of all of the example methods and apparatus disclosed herein.

FIG. 10 is a schematic diagram of an example processor platform P100 that may be used and/or programmed to execute the instructions of FIGS. 7A, 7B, 8 and/or 9 to implement the example service provider interface 202, the example service request receiver 204, the example resource processor 206, the example configuration processor 207, the example resource identifier 208, the example resource database 209, the example configuration group generator 210, the example service database 212, the example configuration group manager 214, the example route manager 216, the example routing table cache 218, the example runtime manager 220, the example runtime database 222 and/or, more generally, the distributive computing network manager 112 of FIGS. 1 and/or 2. For example, the processor platform P100 can be implemented by one or more general-purpose processors, processor cores, microcontrollers, etc.

The processor platform P100 of the example of FIG. 10 includes at least one general purpose programmable processor P105. The processor P105 executes coded instructions P110 and/or P112 present in main memory of the processor P105 (e.g., within a RAM P115 and/or a ROM P120). The coded instructions P110 and/or P112 may be the instructions of FIGS. 7A, 7B, 8, and/or 9. The processor P105 may be any type of processing unit, such as a processor core, a processor and/or a microcontroller. The processor P105 may execute, among other things, the example processes of FIGS. 7A, 7B, 8 and/or 9 to implement the example methods, articles of manufacture, and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example resource database 209, the example service database 212, the example routing table cache 218, and/or the example runtime database 222 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example apparatus including software or firmware executed on hardware, it should be noted that such apparatus are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example apparatus, methods and articles of manufacture, the examples are not the only way to implement such apparatus, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to allocate resources associated with a distributive computing network, the method comprising:
    forming, by a processor, a first geographic configuration group based on a first geographic location specified in resource allocation information and forming a second geographic configuration group based on a second geographic location specified in the resource allocation information, the resource allocation information associated with a service to be hosted by the distributive computing network;
    allocating, by the processor, first physical resources to a first resource configuration group and allocating second physical resources to a second resource configuration group, the first and second resource configuration groups being hierarchical sub-groups of a service configuration group that spans across the first and second geographic configuration groups, the service configuration group being a hierarchical sub-group of both of the first and second geographic configuration groups, the first resource configuration group to be used in connection with the first geographic configuration group exclusive of the second geographic configuration group, and the second resource configuration group to be used in connection with the second geographic configuration group exclusive of the first geographic configuration group;

maintaining, by the processor, service records identifying the first physical resources corresponding to the first resource configuration ground and identifying the second physical resources corresponding to the second resource configuration group;

generating, by the processor, a group topology defining associations between the first resource configuration group, the second resource configuration group, the service configuration group, the first geographic configuration group, and the second geographic configuration group;

hosting, by the processor, the service using the first and second physical resources in accordance with allocation of the first and second physical resources; and routing, by the processor, a request to access the service to the distributive computing network to:
allow access to the first physical resources of the first resource configuration group exclusive of the second physical resources of the second resource configuration group when the request specifies the first geographic configuration group, or
allow access to the first and the second physical resources when the request specifies the service configuration group.

2. The method of claim 1, wherein allocating the first physical resources to the first resource configuration group comprises:
storing the group topology to a database; and
communicatively coupling the first physical resources associated with the first resource configuration group of the group topology to a gateway of the distributive computing network.

3. The method of claim 1, further comprising:
determining a service type associated with the first physical resources associated with the first resource configuration group;
determining a runtime technology to manage the service type by at least one of identifying a specified runtime technology within the received allocation information or cross-referencing the service type to a corresponding runtime technology; and
applying the runtime technology to the service included within each portion of the first physical resources associated with the first resource configuration group.

4. The method of claim 1, wherein the resource allocation information includes at least one of a configuration type, a configuration group, a location for at least one of the first or second physical resources, a data storage requirement, a bandwidth requirement, a runtime engine requirement, an operating system requirement, an application type, a service type, a hosting environment requirement, a lifecycle environment, or a size requirement for at least a portion of the distributive computing network.

5. The method of claim 1, further comprising providing access to both of the first and second physical resources based on an access request specifying the service configuration group.

6. The method of claim 1, further comprising:
based on a first request specifying the first geographic configuration group, performing a first physical resource access to the first physical resources of the first resource configuration group exclusive of the second physical resources of the second resource configuration group; and based on a second request specifying the second geographic configuration group, performing a second physical resource access to the second physical resources of the second resource configuration group exclusive of the first physical resources of the first resource configuration group.

7. The method of claim 1, further comprising:
receiving a request to push an update;
when the request specifies the first geographic configuration group, routing the request to the distributive computing network to push the update to the first physical resources of the first resource configuration group exclusive of the second physical resources of the second resource configuration group; and
when the request specifies the service configuration group, routing the request to the distributive computing network to push the update to both of the first and second physical resources.

8. The method of claim 1, wherein the service configuration group is based on at least one of a service lifecycle, an authorization level of access to the service, or an operating environment.

9. The method of claim 1, further comprising:
during operation of the service, receiving a change in at least one of the first or second physical resources; and
allocating a portion of the changed physical resources to the first or second configuration group.

10. The method of claim 9, wherein the change in the at least one of the first or second physical resources comprises at least one of a reduction in an amount of the physical resources hosting the service, an increase in an amount of the physical resources hosting the service, or new physical resources to host the service.

11. An apparatus to allocate resources associated with a distributive computing network, the apparatus comprising:
a processor; and
memory coupled to the processor, the memory comprising instructions that, when executed by the processor, cause the processor to perform operations comprising:
determining a first geographic configuration group in a first geographic location specified in resource allocation information and determining a second geographic configuration group in a second geographic location specified in the resource allocation information, the resource allocation information associated with a service to be hosted by the distributive computing network;
allocating first physical resources to a first resource configuration group and allocating second physical resources to a second resource configuration group, the first and second resource configuration groups being hierarchical sub-groups of a service configuration group that spans across the first and second geographic configuration groups, the service configuration group being a hierarchical sub-group of both of the first and second geographic configuration groups, the first resource configuration group for use in connection with the first geographic configuration group exclusive of the second geographic configuration group, and the second resource configuration group for use in connection with the second geographic configuration group exclusive of the first geographic configuration group;
maintaining service records identifying the first physical resources corresponding to the first resource configuration ground and identifying the second physical resources corresponding to the second resource configuration group;

generating a group topology defining associations between the first resource configuration group, the second resource configuration group, the service configuration group, the first geographic configuration group, and the second geographic configuration group; and routing a request to access the service to the distributive computing network to:

allow access to the first physical resources of the first resource configuration group exclusive of the second physical resources of the second resource configuration group when the request specifies the first geographic configuration group, or allow access to the first and the second physical resources when the request specifies the service configuration group.

12. The apparatus of claim 11, wherein the memory comprises further instructions that, when executed by the processor, cause the processor to perform operations comprising receiving the resource allocation information.

13. The apparatus of claim 11, wherein the memory comprises further instructions that, when executed by the processor, cause the processor to perform operations comprising:

receiving the request to access the service; and determining if the request is associated with the first geographic configuration group or the second geographic configuration group.

14. The apparatus of claim 11, wherein the memory comprises further instructions that, when executed by the processor, cause the processor to perform operations comprising configuring the first and second physical resources to host the service based on requirements specified for the corresponding ones of the first and second geographic configuration groups.

15. The apparatus of claim 11, wherein allocating the first physical resources to the first resource configuration group comprises:

storing the topology to a database; and communicatively coupling the first physical resources associated with the first configuration group of the group topology to a gateway of the distributive computing network.

16. The apparatus of claim 11, wherein the resource allocation information is received from a customer.

17. The apparatus of claim 11, wherein the memory comprises further instructions that, when executed by the processor, cause the processor to perform operations comprising:

determining a service type associated with the first and second physical resources;

determining a runtime technology to manage the service type by at least one of identifying a specified runtime technology within the received allocation information or cross-referencing the service type to a corresponding runtime technology; and applying the runtime technology to the service included within the first and second physical resources.

18. A tangible machine-accessible storage device comprising instructions that, when executed, cause a machine to perform operations comprising:

forming a first geographic configuration group associated with a first geographic location specified in resource allocation information and forming a second geographic configuration group associated with a second geographic location specified in the resource allocation information, the resource allocation information associated with a service to be hosted by a distributive computing network;

allocating first physical resources to a first resource configuration group and allocating second physical resources to a second resource configuration group, the first and second resource configuration groups being hierarchical sub-groups of a service configuration group that spans across the first and second geographic configuration groups, the service configuration group being a hierarchical sub-group of both of the first and second geographic configuration groups, the first resource configuration group to be used for the first geographic configuration group exclusive of the second geographic configuration group, and the second resource configuration group to be used for the second geographic configuration group exclusive of the first geographic configuration group;

maintaining service records identifying the first physical resources corresponding to the first resource configuration ground and identifying the second physical resources corresponding to the second resource configuration group;

generating a group topology defining associations between the first resource configuration group, the second resource configuration group, the service configuration group, the first geographic configuration group, and the second geographic configuration group;

providing access to both of the first and second physical resources when an access request specifies the service configuration group; and routing the access request to the distributive computing network to allow access to the first physical resources of the first resource configuration group exclusive of the second physical resources of the second resource configuration group when the access request specifies the first geographic configuration group.

19. The tangible machine-accessible storage device of claim 18, further comprising instructions that, when executed, cause the machine to perform operations comprising:

during operation of the service, receiving a change in at least one of the first or second physical resources; and allocating a portion of the changed physical resources to the first or second configuration group.

20. The tangible machine-accessible storage device of claim 19, wherein the change in the at least one of the first or second physical resources comprises at least one of a reduction in an amount of the physical resources hosting the service, an increase in an amount of the physical resources hosting the service, or new physical resources to host the service.

* * * * *